US012223785B2

(12) United States Patent
Hisai et al.

(10) Patent No.: US 12,223,785 B2

(45) Date of Patent: Feb. 11, 2025

(54) ELECTRIC LOCK CONTROL METHOD, ELECTRIC LOCK CONTROL SYSTEM, AND NON-TRANSITORY COMPUTER-READABLE RECORDING MEDIUM

(71) Applicant: Panasonic Intellectual Property Corporation of America, Torrance, CA (US)

(72) Inventors: Masashi Hisai, Osaka (JP); Manabu Maeda, Osaka (JP); Ryo Kato, Osaka (JP); Naohisa Nishida, Osaka (JP); Kenji Harada, Osaka (JP); Tomoyuki Haga, Nara (JP); Yuji Unagami, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 76 days.

(21) Appl. No.: 18/218,807

(22) Filed: Jul. 6, 2023

(65) Prior Publication Data

US 2023/0351825 A1 Nov. 2, 2023

Related U.S. Application Data

(63) Continuation of application No. PCT/JP2021/037479, filed on Oct. 8, 2021.

(Continued)

(30) Foreign Application Priority Data

Jul. 30, 2021 (JP) ................................ 2021-125241

(51) Int. Cl.

| | |
|---|---|
| ***G07C 9/00*** | (2020.01) |
| ***G07C 9/25*** | (2020.01) |
| ***G07C 9/27*** | (2020.01) |

(52) U.S. Cl.

CPC ..... *G07C 9/00309* (2013.01); *G07C 9/00563* (2013.01); *G07C 9/00571* (2013.01);

(Continued)

(58) Field of Classification Search

CPC ...... G07C 9/00309; G07C 9/253; G07C 9/27; G07C 9/00563; G07C 9/00571; G07C 2209/63

(Continued)

(56) References Cited

U.S. PATENT DOCUMENTS 10,638,096 B1 * 4/2020 Lin .................. G08B 13/19656
10,783,728 B1 * 9/2020 Mhaske .................. G07C 9/29

(Continued)

FOREIGN PATENT DOCUMENTS

CN 105976464 A * 9/2016
JP 2006-144421 6/2006

(Continued)

OTHER PUBLICATIONS

International Search Report (ISR) from International Searching Authority (Japan Patent Office) in International Pat. Appl. No. PCT/JP2021/037479, dated Nov. 16, 2021, together with an English language translation.

*Primary Examiner* — Kam Wan Ma

(74) *Attorney, Agent, or Firm* — Greenblum and Bernstein, P.L.C.

(57) ABSTRACT

An electric lock control method includes: performing a first determination of whether a person is present in a predetermined region surrounding an electric lock, based on first information generated by an electronic device; when it is determined that a first person is present in the predetermined region in the performing of the first determination, performing a second determination of whether the first person is a person who is permitted to unlock the electric lock, based on (Continued)

second information related to movement of the first person; and controlling a state of the electric lock based on a result of the second determination, the state being a locked state or an unlocked state.

9 Claims, 36 Drawing Sheets

Related U.S. Application Data

(60) Provisional application No. 63/139,407, filed on Jan. 20, 2021.

(52) U.S. Cl.
CPC ............... *G07C 9/253* (2020.01); *G07C 9/27* (2020.01); *G07C 2209/63* (2013.01)

(58) Field of Classification Search
USPC .......................................................... 340/5.61
See application file for complete search history.

(56) References Cited

U.S. PATENT DOCUMENTS

| | | | | |
|---|---|---|---|---|
| 2002/0099945 | A1* | 7/2002 | McLintock | G07C 9/27 713/186 |
| 2002/0140542 | A1* | 10/2002 | Prokoski | G06V 40/10 340/5.52 |

FOREIGN PATENT DOCUMENTS

| | | | |
|---|---|---|---|
| JP | 2007-255094 | | 10/2007 |
| JP | 2009-101927 | | 5/2009 |
| JP | 2011-063961 | | 3/2011 |
| JP | 2013-140462 | | 7/2013 |
| JP | 2017-059178 | | 3/2017 |
| JP | 2018-077552 | | 5/2018 |
| JP | 2018077552 | A * | 5/2018 |
| JP | 2019-152024 | | 9/2019 |

* cited by examiner

| No. | Person | Machine learning model |
|---|---|---|
| 1 | First person A |  |
| 2 | Second person A |  |
| 3 | Third person A |  |

| No. | Person | Machine learning model |
|---|---|---|
| 1 | First person A |  |
| 2 | Second person A | |
| 3 | Third person A | |

ELECTRIC LOCK CONTROL METHOD, ELECTRIC LOCK CONTROL SYSTEM, AND NON-TRANSITORY COMPUTER-READABLE RECORDING MEDIUM

CROSS REFERENCE TO RELATED APPLICATIONS

This is a continuation application of PCT International Application No. PCT/JP2021/037479 filed on Oct. 8, 2021, designating the United States of America, which is based on and claims priority of Japanese Patent Application No. 2021-125241 filed on Jul. 30, 2021, and U.S. Provisional Patent Application No. 63/139,407 filed on Jan. 20, 2021. The entire disclosures of the above-identified applications, including the specifications, drawings and claims are incorporated herein by reference in their entirety.

FIELD

The present disclosure relates to an electric lock control method, etc. for controlling an electric lock.

BACKGROUND

Techniques for controlling electric locks are conventionally known (see, for example, Patent Literature (PTL) 1).

CITATION LIST

Patent Literature

PTL 1: Japanese Unexamined Patent Application Publication No. 2011-63961

SUMMARY

Technical Problem

It is desired to inhibit a person who is not permitted to unlock an electric lock from unlocking the electric lock in an unauthorized manner.

In view of the above, an object of the present disclosure is to provide an electric lock control method, etc. that are capable of inhibiting a person who is not permitted to unlock an electric lock from unlocking the electric lock in an unauthorized manner.

Solution to Problem

An electric lock control method according to one aspect of the present disclosure includes performing a first determination of whether a person is present in a predetermined region surrounding an electric lock, based on first information generated by an electronic device; when it is determined that a first person is present in the predetermined region in the performing of the first determination, performing a second determination of whether the first person is a person who is permitted to unlock the electric lock, based on second information related to movement of the first person; and controlling a state of the electric lock based on a result of the second determination, the state being a locked state or an unlocked state.

An electric lock control system according to one aspect of the present disclosure includes a first determiner that determines whether a person is present in a predetermined region surrounding an electric lock, based on first information generated by an electronic device; a second determiner that, when the first determiner has determined that a first person is present in the predetermined region, determines whether the first person is a person who is permitted to unlock the electric lock, based on second information related to movement of the first person; and a controller that controls a state of the electric lock based on a result of the determination by the second determiner, the state being a locked state or an unlocked state.

A non-transitory computer-readable recording medium according to one aspect of the present disclosure is a non-transitory computer-readable recording medium having recorded thereon a computer program for causing a computer to execute electric lock control processing, and the electric lock control processing includes: performing a first determination of whether a person is present in a predetermined region surrounding an electric lock, based on first information generated by an electronic device; when it is determined that a first person is present in the predetermined region in the performing of the first determination, performing a second determination of whether the first person is a person who is permitted to unlock the electric lock, based on second information related to movement of the first person; and controlling a state of the electric lock based on a result of the second determination, the state being a locked state or an unlocked state.

Advantageous Effects

With the electric lock control method, etc. according to one aspect of the present disclosure, it is possible to inhibit a person who is not permitted to unlock an electric lock from unlocking the electric lock in an unauthorized manner.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
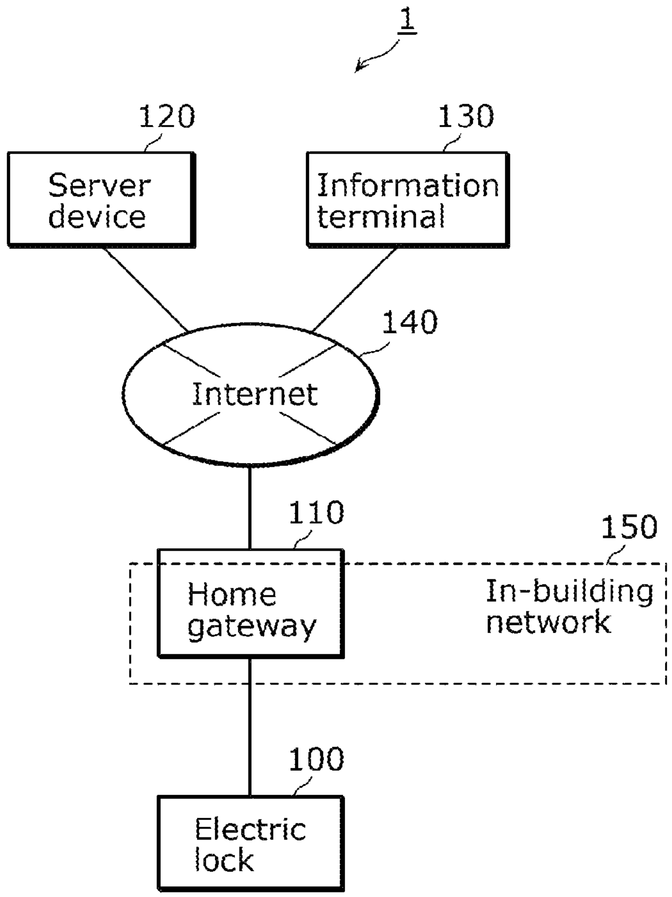
FIG. 1 is a block diagram illustrating one example of a hardware configuration of an electric lock control system according to Embodiment 1.

Circumstances Leading to One Aspect of the Present Disclosure

In recent years, various electronic devices in a building have been connected to a gateway or a router (hereafter simply referred to as "gateway") disposed in the building. Users of the electronic devices connected to the gateway are capable of operating the operation of the electronic devices via the gateway. For this reason, the convenience at the time of using electronic devices connected to the gateway by users of the devices has been improved compared to the time before the devices were connected to the gateway.

On the other hand, when, for example, the gateway is hijacked by a third party, there is a possibility that the electronic devices connected to the gateway are controlled in an unauthorized manner by the third party.

In particular, when the electronic device connected to the gateway is an electric lock disposed on a door that is an entrance to the building, there is a possibility that unauthorized entry into the building by the third party is enabled.

In view of the above, the inventors have conducted a series of diligent investigation and experiments in regard to a method of inhibiting a person who is not permitted to unlock an electric lock from unlocking the electric lock in an unauthorized manner.

As a result, the inventors have obtained knowledge that, when a person in proximity to an electric lock is not permitted to unlock the electric lock, it is possible to inhibit unlocking of the electric lock in an unauthorized manner by the person who is not permitted to unlock the electric lock, by controlling locking or unlocking of the electric lock to inhibit the unlocking of the electric lock.

The inventors have further conducted a series of investigation and experiments on the basis of the above-described knowledge, and arrived at an electric lock control method, an electric lock control system, and a non-transitory computer-readable recording medium according to the present disclosure described below.

An electric lock control method according to one aspect of the present disclosure includes performing a first determination of whether a person is present in a predetermined region surrounding an electric lock, based on first information generated by an electronic device; when it is determined that a first person is present in the predetermined region in the performing of the first determination, performing a second determination of whether the first person is a person who is permitted to unlock the electric lock, based on second information related to movement of the first person; and controlling a state of the electric lock based on a result of the second determination, the state being a locked state or an unlocked state.

According to the above-described electric lock control method, when it is determined that a person in proximity to an electric lock is a person who is not permitted to unlock the electric lock, it is possible to control the state, which is a locked state or an unlocked state, of the electric lock to inhibit the unlocking of the electric lock.

With this, according to the above-described electric lock control method, it is possible to inhibit unlocking of an electric lock in an unauthorized manner by a person who is not permitted to unlock the electric lock.

In addition, the electronic device may be an information terminal carried by the first person, the first information may be positional information indicating a position of the information terminal, and the second information may be: acceleration information indicating an acceleration rate detected by an acceleration sensor included in the information terminal; or step count information indicating a step count of the first person counted by the information terminal.

With this, it is possible to determine whether the first person is the person who is permitted to unlock the electric lock, based on information related to the information terminal.

In addition, the electronic device may be an imaging device, the first information may be an image captured by the imaging device, and the second information may be gait information related to a gait of the first person, the gait information being calculated based on the image captured by the imaging device.

With this, it is possible to determine whether the first person is the person who is permitted to unlock the electric lock, based on information related to an image captured by the imaging device.

In addition, the electric lock may be disposed on a door of a doorway of a building, the electronic device may be: a battery charger that charges an electric vehicle and is disposed in the building or within a predetermined range from the building; or a distribution board that supplies power to the battery charger, the first information may be connection information indicating that the electric vehicle has been connected to the battery charger, and the second information may be acceleration information indicating an acceleration rate detected by an acceleration sensor included in an information terminal carried by the first person.

With this, it is possible to determine whether the first person is the person who is permitted to unlock the electric lock, based on information related to the battery charger.

In addition, in the performing of the second determination, whether the first person is the person who is permitted to unlock the electric lock may be determined using a machine learning model trained in advance to output, in response to the second information being input, a score indicating certainty that the first person is the person who is permitted to unlock the electric lock.

With this, it is possible to determine whether the first person is the person who is permitted to unlock the electric lock, using the machine learning model.

An electric lock control system according to one aspect of the present disclosure includes a first determiner that determines whether a person is present in a predetermined region surrounding an electric lock, based on first information generated by an electronic device; a second determiner that, when the first determiner has determined that a first person is present in the predetermined region, determines whether the first person is a person who is permitted to unlock the electric lock, based on second information related to movement of the first person; and a controller that controls a state of the electric lock based on a result of the determination by the second determiner, the state being a locked state or an unlocked state.

According to the above-described electric lock control system, when it is determined that a person in proximity to an electric lock is a person who is not permitted to unlock the electric lock, it is possible to control the state, which is a locked state or an unlocked state, of the electric lock to inhibit the unlocking of the electric lock.

With this, according to the above-described electric lock control system, it is possible to inhibit unlocking of an electric lock in an unauthorized manner by a person who is not permitted to unlock the electric lock.

A non-transitory computer-readable recording medium according to one aspect of the present disclosure is a non-transitory computer-readable recording medium having recorded thereon a computer program for causing a computer to execute electric lock control processing, and the electric lock control processing includes: performing a first determination of whether a person is present in a predetermined region surrounding an electric lock, based on first information generated by an electronic device; when it is determined that a first person is present in the predetermined region in the performing of the first determination, performing a second determination of whether the first person is a person who is permitted to unlock the electric lock, based on second information related to movement of the first person; and controlling a state of the electric lock based on a result of the second determination, the state being a locked state or an unlocked state.

According to the above-described non-transitory computer-readable recording medium, when it is determined that a person in proximity to an electric lock is a person who is not permitted to unlock the electric lock, it is possible to control the state, which is a locked state or an unlocked state, of the electric lock to inhibit the unlocking of the electric lock.

With this, according to the above-described non-transitory computer-readable recording medium, it is possible to inhibit unlocking of an electric lock in an unauthorized manner by a person who is not permitted to unlock the electric lock.

Hereinafter, specific examples of the electric lock control system according to one aspect of the present disclosure will be described with reference to the drawings. It should be noted that each of the embodiments described below shows a specific example of the present disclosure. The numerical values, shapes, structural elements, the arrangement and connection of the structural elements, steps (processes), and the processing order of the steps, for instance, described in the following embodiments are mere examples, and thus are not intended to limit the scope of the present disclosure. The drawings are schematically illustrated diagrams and do not necessarily give strict illustration. Throughout the drawings, the same numeral is given to substantially the same structural element, and redundant description will be omitted or simplified.

Embodiment 1

The following describes an electric lock control system according to Embodiment 1. This electric lock control system is a system that determines whether a person is present in proximity to an electric lock and whether the person is a person who is not permitted to unlock the electric lock, and controls the state, which is a locked state or an unlocked state, of the electric lock on the basis of a result of the determination.

Configuration

FIG. 1 is a block diagram illustrating one example of the hardware configuration of electric lock control system 1 according to Embodiment 1.

Figure 2:
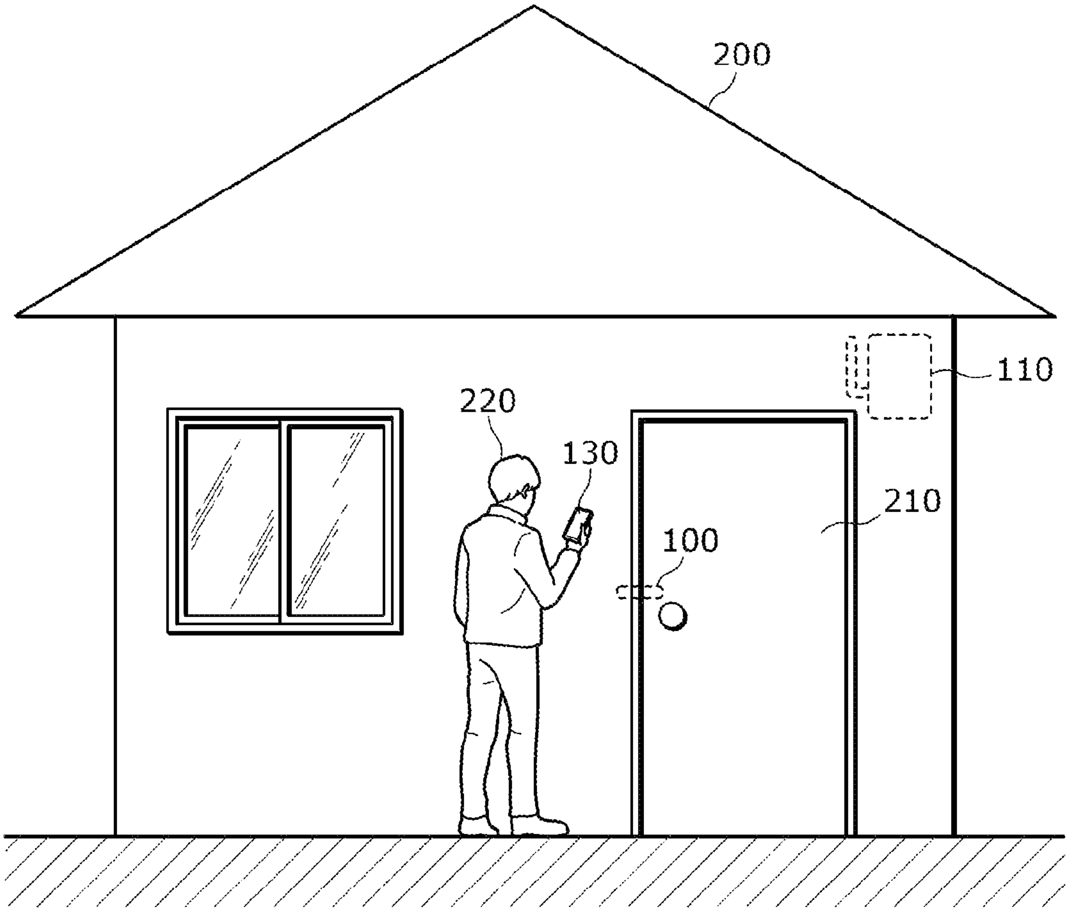
FIG. 2 is diagram schematically illustrating a portion of the hardware configuration of the electric lock control system according to Embodiment 1 provided to a building.

FIG. 2 is a diagram schematically illustrating a portion of the hardware configuration of electric lock control system 1 provided to building 200.

As illustrated in FIG. 1, electric lock control system 1 includes electric lock 100, home gateway 110, server device 120, information terminal 130, Internet 140, and in-building network 150.

Electric lock 100 is a lock that is connected to in-building network 150, receives a control signal transmitted from home gateway 110 via in-building network 150, and switches between a locked state and an unlocked state based on the control signal that has been received.

In Embodiment 1, electric lock 100 is described as being disposed on door 210 of the doorway of building 200, as a lock that locks or unlocks door 210, as illustrated in FIG. 2.

For example, building 200 may be a house, and door 210 may be the entrance of building 200 which is a house.

It should be noted that electric lock 100 is described here as a lock that locks or unlocks door 210, but electric lock 100 need not necessarily be limited to a lock that locks or unlocks door 210. Electric lock 100 may be, for example, a lock that locks or unlocks a door of a passenger car or a lock that locks or unlocks a safe.

Home gateway 110 is disposed in building 200 and is connected to in-building network 150 built within building 200 and Internet 140, and relays communications between devices connected to in-building network 150 and between devices connected to in-building network 150 and devices connected to Internet 140.

Home gateway 110 includes a communication interface, a touch panel, a processor, and a memory, and the processor executes a program stored in the memory, thereby implementing various functions.

Information terminal 130 is a portable terminal connected to Internet 140.

In Embodiment 1, information terminal 130 is described as a smartphone which includes an acceleration sensor and a magnetic sensor, has a global positioning system (GPS) function, and is carried by person 220.

It should be noted that, although information terminal 130 is described as a smartphone carried by person 220 in Embodiment 1, information terminal 130 need not necessarily be limited to a smartphone, as long as it can communicate with server device 120 and home gateway 110 and is carried by person 220. Information terminal 130 may be, for example, a wearable device or a pedometer.

Information terminal 130 further includes a communication interface, a touch panel, a processor, and a memory, and the processor executes a program stored in the memory, thereby implementing various functions.

Information terminal 130 calculates the position of information terminal 130 using the GPS function for each predetermined period T1 (e.g., 1 second), detects an acceleration rate using the acceleration sensor, and detects magnetism using the magnetic sensor.

Server device 120 is, as it is called, a computer device, and is connected to Internet 140.

Server device 120 includes a communication interface, an input interface, a display, a processor, and a memory, and the processor executes a program stored in the memory to realize various functions.

Figure 3:
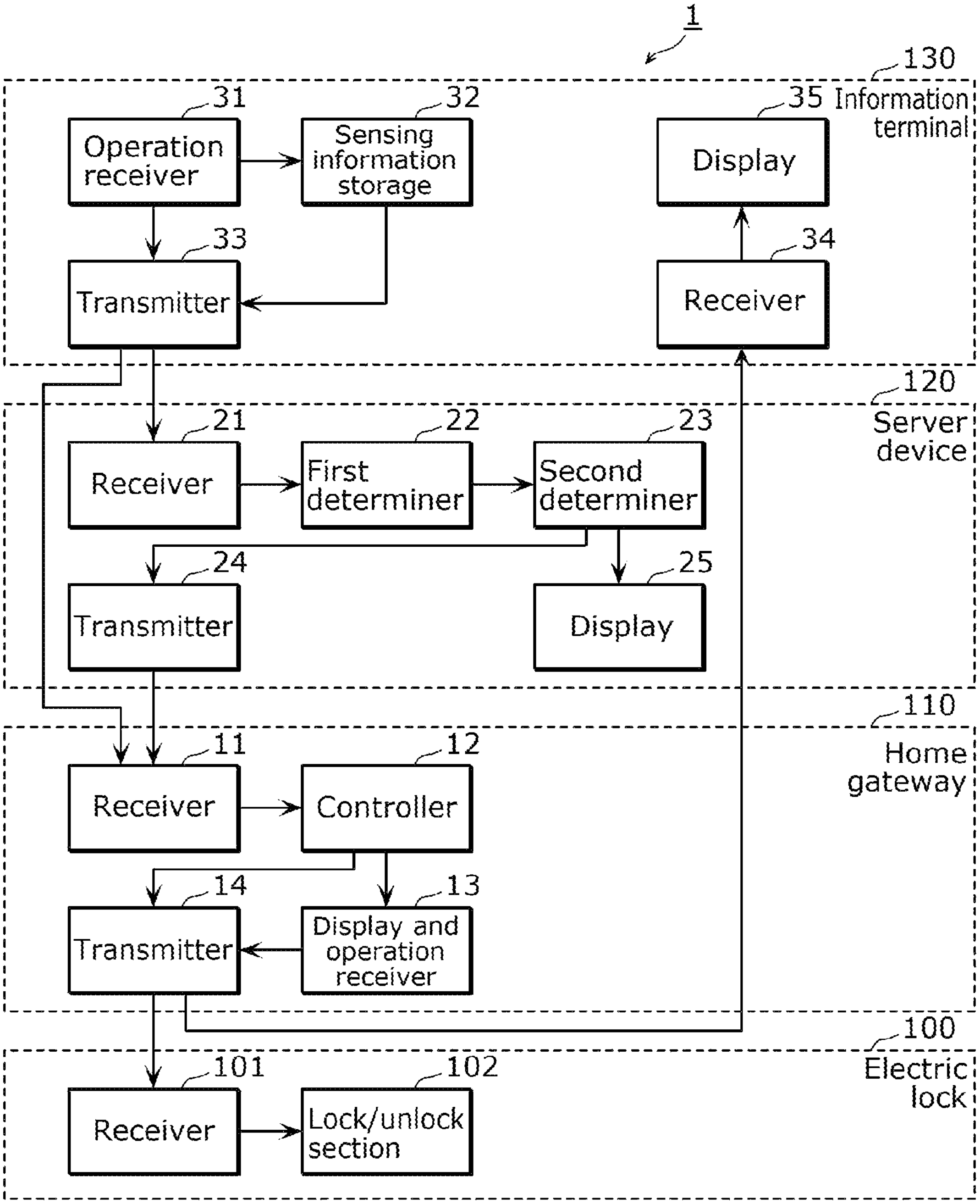
FIG. 3 is a block diagram illustrating one example of a functional configuration of the electric lock control system according to Embodiment 1.

FIG. 3 is a block diagram illustrating one example of the functional configuration of electric lock control system 1.

As illustrated in FIG. 3, electric lock control system 1 includes operation receiver 31, sensing information storage 32, transmitter 33, receiver 34, display 35, receiver 21, first determiner 22, second determiner 23, transmitter 24, display 25, receiver 11, controller 12, display and operation receiver 13, transmitter 14, receiver 101, and lock/unlock section 102.

Operation receiver 31, sensing information storage 32, transmitter 33, receiver 34, and display 35 are implemented by information terminal 130. Receiver 21, first determiner 22, second determiner 23, transmitter 24, and display 25 are implemented by server device 120. Receiver 11, controller 12, display and operation receiver 13, and transmitter 14 are implemented by home gateway 110. Receiver 101 and lock/unlock section 102 are implemented by electric lock 100.

It should be noted that, although first determiner 22 and second determiner 23 are described as being implemented by server device 120, and controller is described as being implemented by home gateway 110 in Embodiment 1, first determiner 22, second determiner 23, and controller 12 may each be implemented by any of information terminal 130, server device 120, or home gateway 110.

Sensing information storage 32 stores the position of information terminal 130 calculated using the GPS function, the acceleration rate detected by the acceleration sensor, and the magnetism detected by the magnetic sensor.

Operation receiver 31 receives an operation on information terminal 130 by a user who uses information terminal 130.

When operation receiver 31 receives an operation for requesting unlocking of electric lock 100 from the user who uses information terminal 130, transmitter 33 (*i*) transmits an unlocking request signal for requesting unlocking of electric lock 100, to home gateway 110, and (ii) transmits to server device 120: positional information indicating a position of information terminal 130 at the time when the operation is received; acceleration information indicating an acceleration rate detected by an acceleration sensor in predetermined period T2 (e.g., one hour) from the time when the operation is received to the past; and magnetic information indicating magnetism detected by the magnetic sensor in predetermined period T2 from the time when the operation is received to the past, by referring to data stored in sensing information storage 32.

Receiver 21 receives the positional information, the acceleration information, and the magnetic information which have been transmitted from information terminal 130.

First determiner 22, when receiver 21 receives the positional information from information terminal 130, determines whether person 220 who carries information terminal 130 is present in a predetermined range surrounding electric lock 100 (e.g., in a rage within two meters from electric lock 100), based on the positional information received by receiver 21.

First determiner 22 may, for example: calculate a distance between the position of information terminal 130 indicated by the positional information and the position of electric lock 100 stored in advance; when the distance that has been calculated is less than or equal to a predetermined threshold, make a determination affirming that person 220 who carries information terminal 130 is present in a predetermined range surrounding electric lock 100; and when the distance that has been calculated is greater than the predetermined threshold, make a determination denying that person 220 who carries information terminal 130 is present in the predetermined range surrounding electric lock 100.

Second determiner 23, when it is determined by first determiner 22 that person 220 who carries information terminal 130 is present in the predetermined range surrounding electric lock 100, determines whether person 220 is person A who is permitted to unlock electric lock 100, based on the acceleration information and the magnetic information which have been received by receiver 21.

Person A who is permitted to unlock electric lock 100 is, for example, when building 200 is a house, a resident of the house. In addition, for example, when building 200 is an office building, person A who is permitted to unlock electric lock 100 is an office worker who works at a company which operates in the office building.

Although the following describes that second determiner 23 determines whether person 220 is person A based also on magnetic information in addition to acceleration information, second determiner 23 need not necessarily be limited to being configured to determine whether person 220 is person A based on acceleration information and magnetic information, as long as being configured to determine whether person 220 is person A based on at least acceleration information.

Second determiner 23 may, for example: estimate, based on the acceleration information and the magnetic information, a moving route of person 220 in predetermined period T2 from the time when the operation for requesting unlocking of electric lock 100 is received to the past; calculate a difference between the moving route that has been estimated and a typical moving route of person A that has been stored in advance; determine that person 220 is person A when the difference that has been calculated is less than or equal to a predetermined threshold; and determine that person 220 is not person A when the difference is greater than the predetermined threshold.

Here, the difference between the moving route that has been estimated and a typical moving route may be, for example, a cumulative value of the difference in a distance between the position in the moving route that has been estimated and the position in the typical moving, per minute.

The typical moving route of person A may be, for example, a homeward route from the work site of person A to building 200 that is the house of person A.

Figure 4:
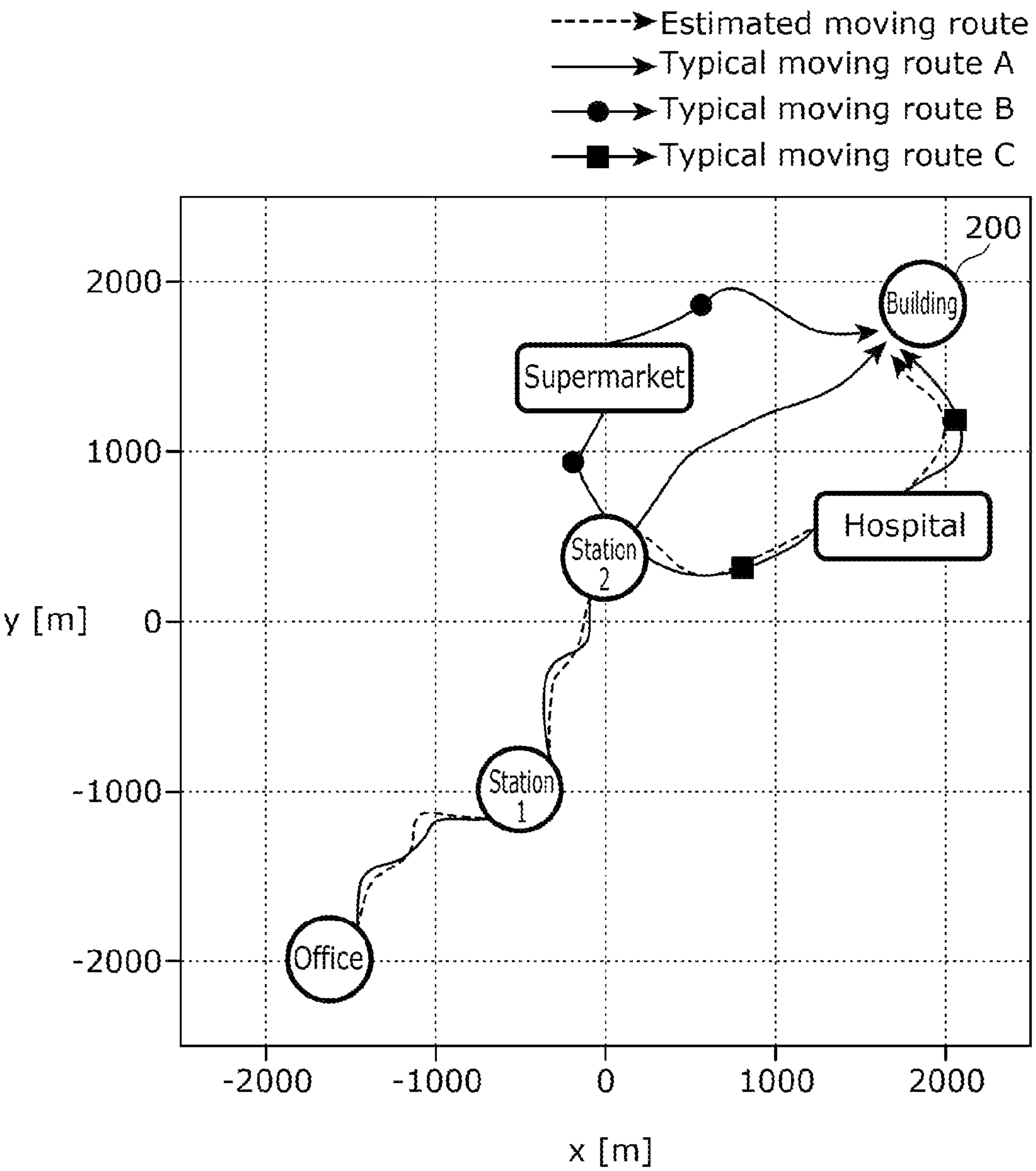
FIG. 4 is a diagram schematically illustrating how a second determiner according to Embodiment 1 determines whether a person who is present in a predetermined range of the electric lock is a person who is permitted to unlock the electric lock, based on acceleration information and magnetic information.

FIG. 4 is a diagram schematically illustrating one example of how second determiner 23 determines whether person 220 is person A based on the acceleration information and the magnetic information.

As illustrated in FIG. 4, second determiner 23 first maps typical moving route A of person A stored in advance, typical moving route B of person A stored in advance, typical moving route C of person A stored in advance, and an estimated moving route, on a map of the area surrounding building 200.

Next, second determiner 23 selects a moving route that is most similar to the estimated moving route, from among moving route A, moving route B, and moving route C.

Then, second determiner 23 calculates: a difference between the selected moving route and the estimated moving route; determines that person 220 is person A when the calculated difference is less than or equal to a predetermined threshold; and determines that person 220 is not person A when the calculated difference is greater than the predetermined threshold.

It should be noted that, in the case where second determiner 23 is configured to determine whether person 220 is person A based on the acceleration information, second determiner 23 may, for example, determine that person 220 is person A when the difference between the absolute value of the acceleration rate indicated by the acceleration information (for example, the square-root of sum of squares of each acceleration rate in the three-dimensional direction) and the absolute value of the acceleration rate in a typical moving route of person A that has been stored in advance is less than or equal to a predetermined threshold, and determine that person 220 is not person A when the difference is greater than the predetermined threshold.

Here, the difference between the absolute value of the acceleration rate in a typical moving route and the absolute value of the acceleration rate indicated by the acceleration information may be, for example, the cumulative value of the difference between the absolute value of the acceleration rate in the typical moving route and the absolute value of the acceleration rate indicated by the acceleration information per minute.

Figure 5:
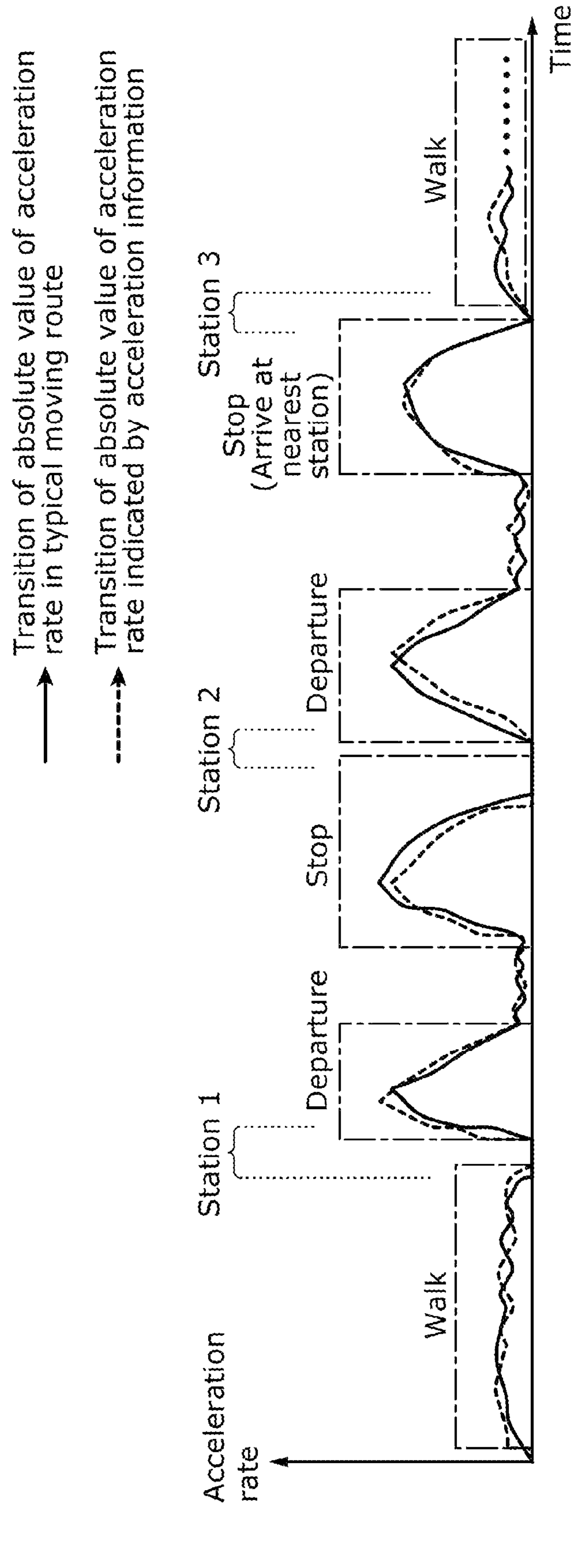
FIG. 5 is a diagram schematically illustrating how a second determiner according to Embodiment 1 determines whether a person who is present in a predetermined range of the electric lock is a person who is permitted to unlock the electric lock, based on the acceleration information.

FIG. 5 is a diagram schematically illustrating one example of how second determiner 23 determines whether person 220 is person A, based on the acceleration information.

As illustrated in FIG. 5, second determiner 23 first maps, on a time axis, the absolute value of the acceleration rate in the typical moving route of person A that has been stored in advance and the absolute value of the acceleration rate indicated by the acceleration information.

Then, second determiner 23 calculates: a difference between the absolute value of the acceleration rate in the typical moving route and the absolute value of the acceleration rate indicated by the acceleration information; determines that person 220 is person A when the calculated difference is less than or equal to a predetermined threshold; and determines that person 220 is not person A when the calculated difference is greater than the predetermined threshold.

In a typical moving route, when person A boards on a train and the train on which the person boards departs, a sudden increase in the acceleration rate, a characteristic acceleration rate due to the vibration of the train, etc. appear. In addition, when the train on which the person boards stops, and person A gets off the train and starts walking, a sudden increase in the acceleration rate, a characteristic acceleration due to walking, etc. appear.

Returning again to FIG. 3, the description of electric lock control system 1 will be continued.

Display 25 displays an image based on a result of the determination performed by second determiner 23.

Figure 6:
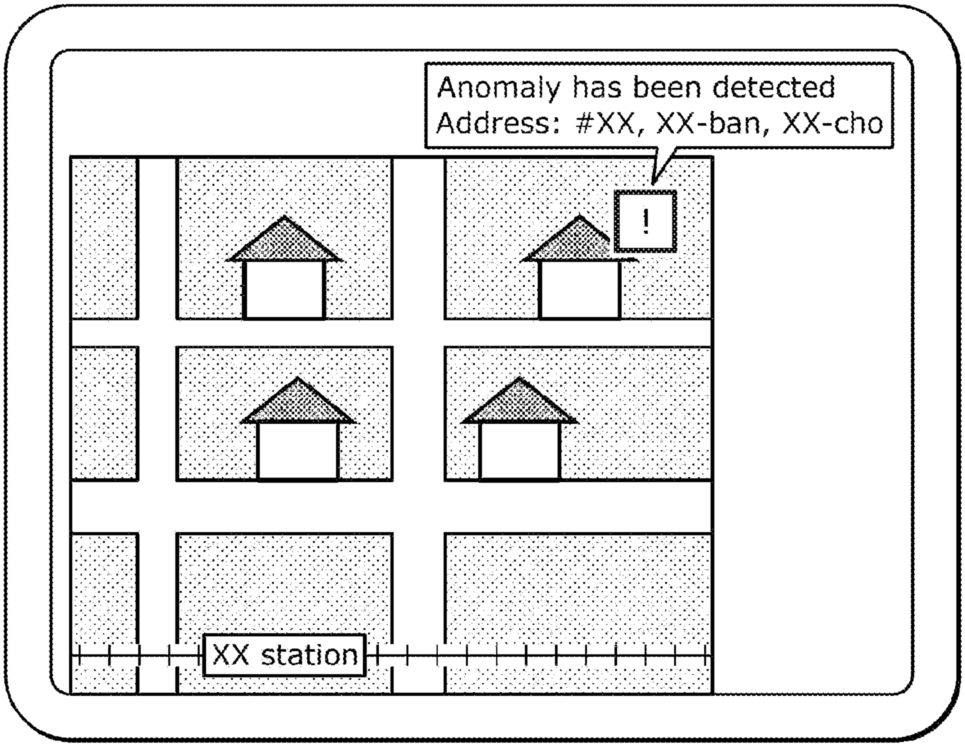
FIG. 6 is a diagram schematically illustrating one example of an image displayed by a display according to Embodiment 1.

FIG. 6 is a diagram schematically illustrating one example of an image displayed by display 25.

As illustrate in FIG. 6, when second determiner 23 determines that person 220 is not person A, display 25 displays, for example, an image with an alarm indicating that an anomaly regarding building 200 has been detected superimposed on a map of the area surrounding building 200.

With this, electric lock control system 1 is capable of notifying the user who uses server device 120 that an anomaly regarding building 200 has been detected.

Returning again to FIG. 3, the description of electric lock control system 1 will be continued.

Transmitter 24 transmits determination result information indicating a result of the determination performed by second determiner 23 to home gateway 110.

Receiver 11 receives the unlocking request signal transmitted by information terminal 130 and determination result information transmitted by server device 120.

Controller 12 controls a state, which is a locked state or an unlocked state, of electric lock 100 based on the result of the determination performed by second determiner 23.

More specifically, in the case where receiver 11 receives an unlocking request signal from information terminal 130 and a determination result information from server device 120, controller 12: outputs a first unlock signal indicating that electric lock 100 is to be put in an unlocked state when the determination result information that has been received indicates that it is determined that person 220 is person A; and outputs a warning signal indicating that an unlocking request signal has been transmitted from information terminal 130 carried by a person who is not person A, without outputting the first unlock signal when the determination result information that has been received indicates that it is determined that person 220 is not person A, thereby controlling the state, which is a locked state or an unlocked state, of electric lock 100.

Display and operation receiver 13 displays an image indicating the state, which is a locked state or an unlocked state, of electric lock 100 that is controlled by controller 12.

In addition, display and operation receiver 13 receives an operation related to the locking or unlocking of electric lock 100 by the user of home gateway 110.

Figure 7:
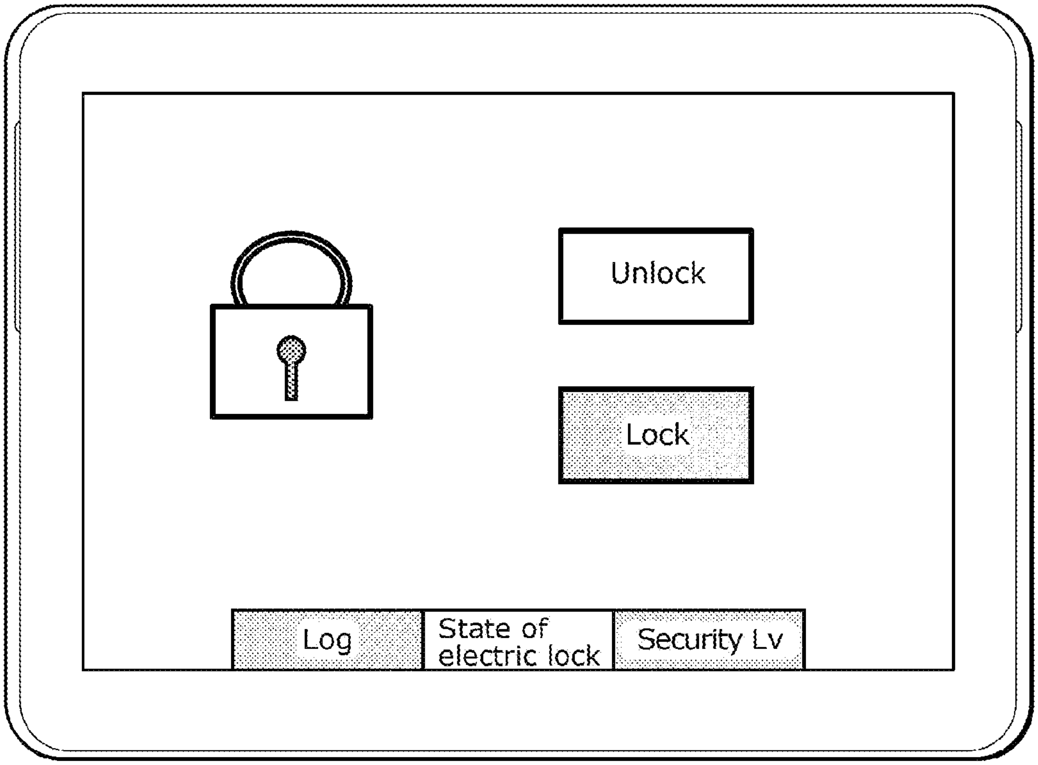
FIG. 7 is a diagram schematically illustrating one example of an image displayed by a display and operation receiver according to Embodiment 1.

FIG. 7 is a diagram schematically illustrating one example of the image displayed by display and operation receiver 13.

Here, the image illustrated in FIG. 7 is one example of the image displayed when electric lock 100 is in a locked state.

Returning again to FIG. 3, the description of electric lock control system 1 will be continued.

Display and operation receiver 13 displays an image that represents a security level related to the locking or unlocking of electric lock 100.

In addition, display and operation receiver 13 also receives an operation to change the security level related to the locking or unlocking of electric lock 100, by the user of home gateway 110.

Figure 8:
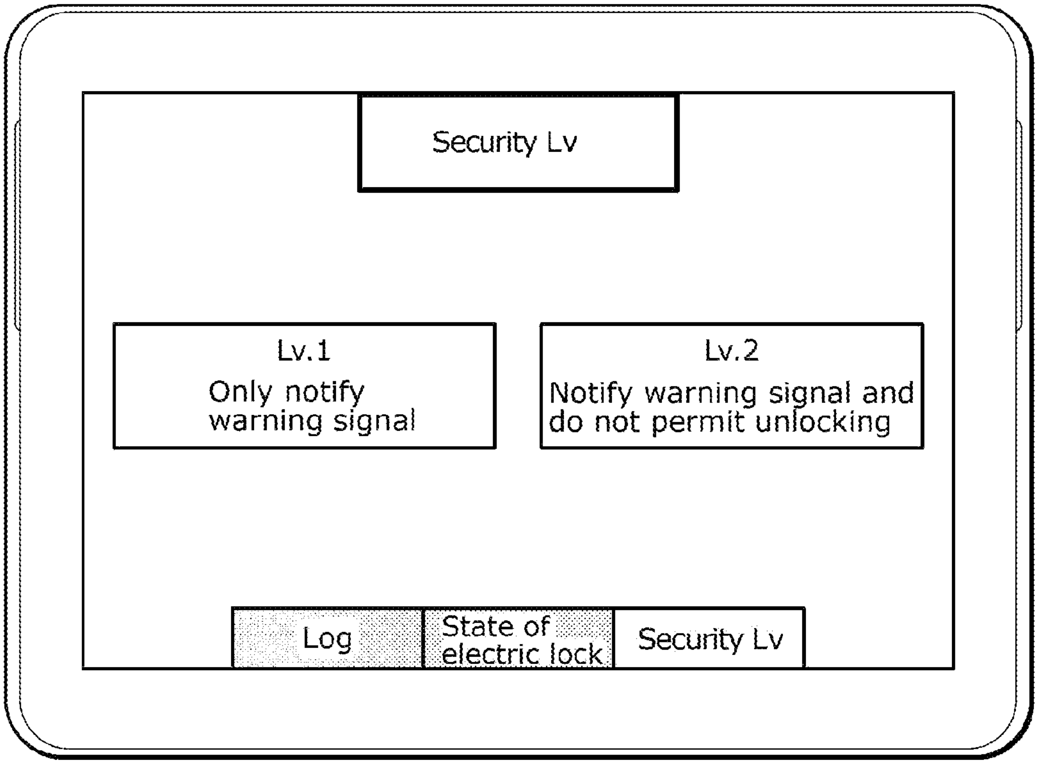
FIG. 8 is a diagram schematically illustrating one example of an image displayed by the display and operation receiver according to Embodiment 1.

FIG. 8 is a diagram schematically illustrating one example of the image displayed by display and operation receiver 13.

Here, the image illustrated in FIG. 8 is one example of the image displayed in the case where the security level related to the locking or unlocking of electric lock 100 includes two levels, namely, level 1 and level 2. Here, level 1 is a security level at which, when the warning signal is output from controller 12, display and operation receiver 13 and display 35 are caused to display an image indicating that a warning signal has been output while electric lock 100 is unlocked, and level 2 is a security level at which, when the warning signal is output from controller 12, display and operation receiver 13 and display 35 are caused to display an image indicating that a warning signal has been output while electric lock 100 is not unlocked.

Returning again to FIG. 3, the description of electric lock control system 1 will be continued.

Display and operation receiver 13 also displays a log of locking or unlocking of electric lock 100.

Figure 9:
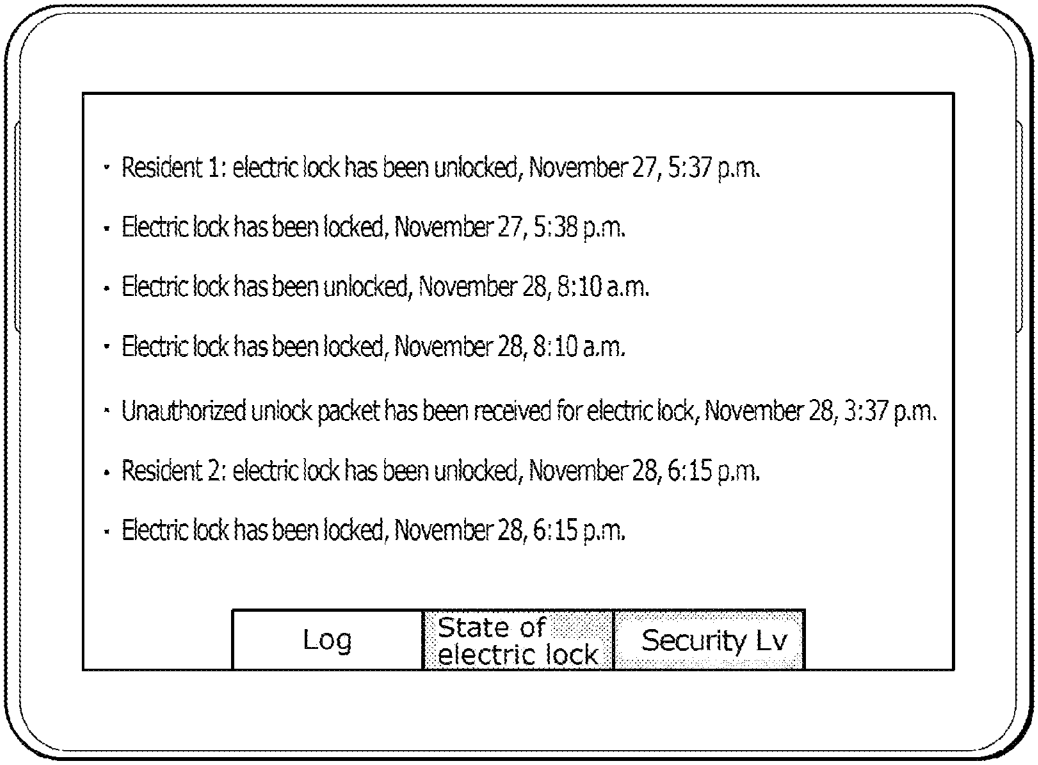
FIG. 9 is a diagram schematically illustrating one example of an image displayed by the display and operation receiver according to Embodiment 1.

FIG. 9 is a diagram schematically illustrating one example of the image displayed by display and operation receiver 13.

Returning again to FIG. 3, the description of electric lock control system 1 will be continued.

When a warning signal has been output by controller 12 in the case where the security level related to the locking or unlocking of electric lock 100 is at level 1, display and operation receiver 13 displays an image indicating that the warning signal has been output. Then, display and operation receiver 13 outputs a second unlock signal indicating that electric lock 100 is to be in an unlocked state.

In addition, when a warning signal has been output by controller 12 in the case where the security level related to the locking or unlocking of electric lock 100 is at level 2, display and operation receiver 13 displays an image indicating that the warning signal has been output. In this case, display and operation receiver 13 does not output the second unlock signal.

At this time, display and operation receiver 13 may: perform a display to prompt the user of home gateway 110 to perform an operation for either permitting or not permitting unlocking of electric lock 100; output the second unlock signal when the operation for permitting unlocking of electric lock 100 is received from the user of home gateway 110; and not output the second unlock signal when the operation for not permitting unlocking of electric lock 100 is received from the user of home gateway 110.

Transmitter 14, when controller outputs the warning signal, transmits the warning signal that has been output from controller 12, to information terminal 130.

In addition, transmitter 14: when controller 12 outputs the first unlock signal, transmits, to electric lock 100, the first unlock signal output from controller 12; and when display and operation receiver 13 outputs the second unlock signal, transmits, to electric lock 100, the second unlock signal output from display and operation receiver 13.

Receiver 34 receives the warning signal transmitted from home gateway 110.

Display 35 displays an image to prompt the user of information terminal 130 to perform an operation for requesting unlocking of electric lock 100.

In addition, when receiver 34 receives a warning signal, display 35 displays an image indicating that the warning signal has been output.

Figure 10:
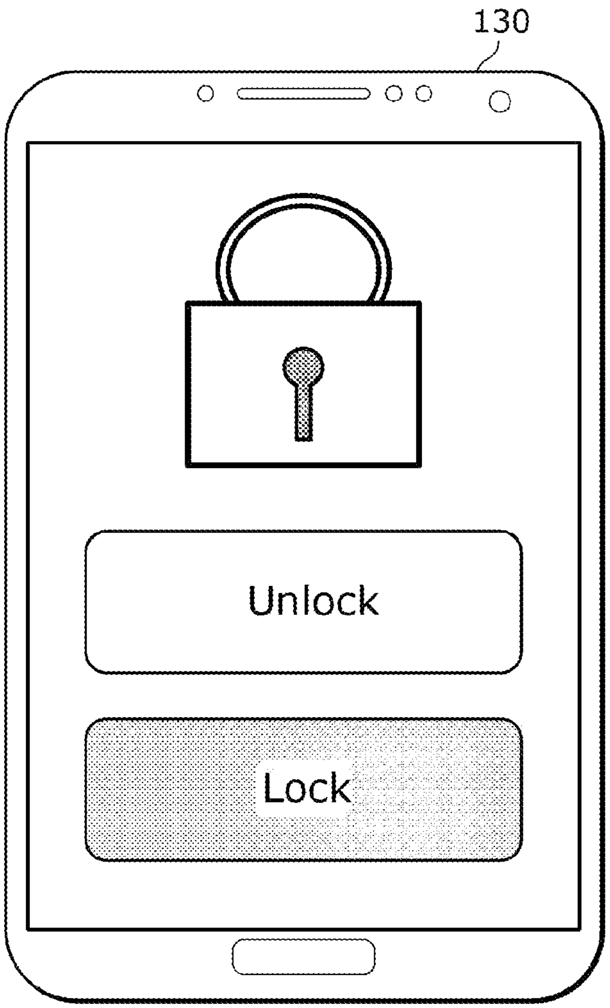
FIG. 10 is a diagram schematically illustrating one example of an image displayed by the display according to Embodiment 1.

FIG. 10 is a diagram schematically illustrating one example of the image which is displayed by display 35, and prompts an operation for requesting unlocking of electric lock 100.

Figure 11:
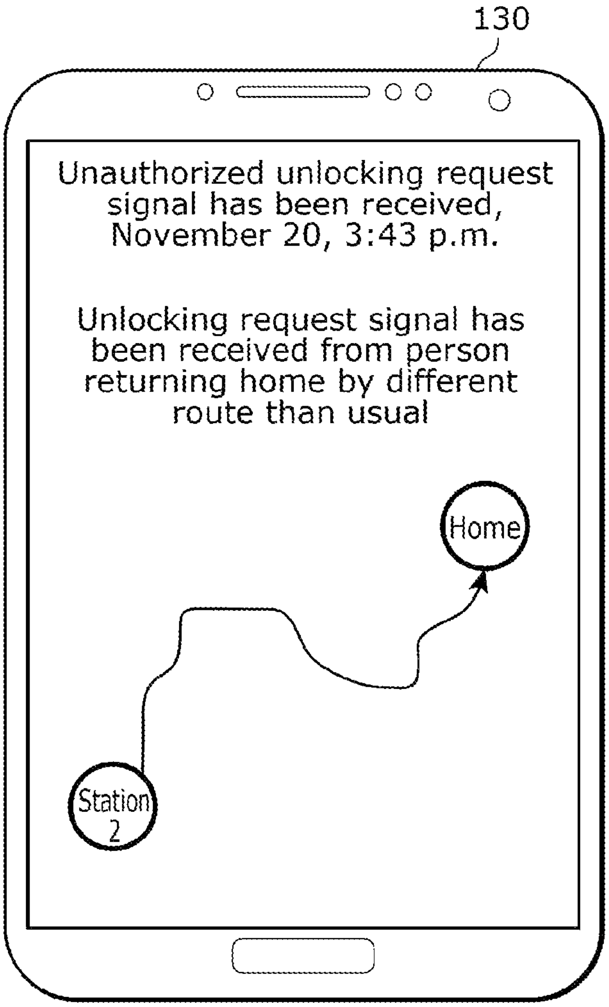
FIG. 11 is a diagram schematically illustrating one example of an image displayed by the display according to Embodiment 1.

FIG. 11 is a diagram schematically illustrating one example of the image which is displayed by display 35, and indicates that a warning signal has been output.

Returning again to FIG. 3, the description of electric lock control system 1 will be continued.

Receiver 101 receives the first unlock signal and the second unlock signal that have been transmitted from transmitter 14.

Lock/unlock section 102 puts electric lock 100 in an unlocked state when receiver 101 receives the first unlock signal and when receiver 101 receives the second unlock signal.

Operation

The following describes an operation performed by electric lock control system 1 which has the above-described configuration.

Electric lock control system 1 performs a first electric lock control processing that controls the state, which is a locked state or an unlocked state, of electric lock 100. The first electric lock control processing is started by, for example, performing, by person 220, an operation for starting the first electric lock control processing on information terminal 130 carried by person 220. The operation for starting the first electric lock control processing may be an operation for activating a predetermined application installed in information terminal 130, for example.

Figure 12:
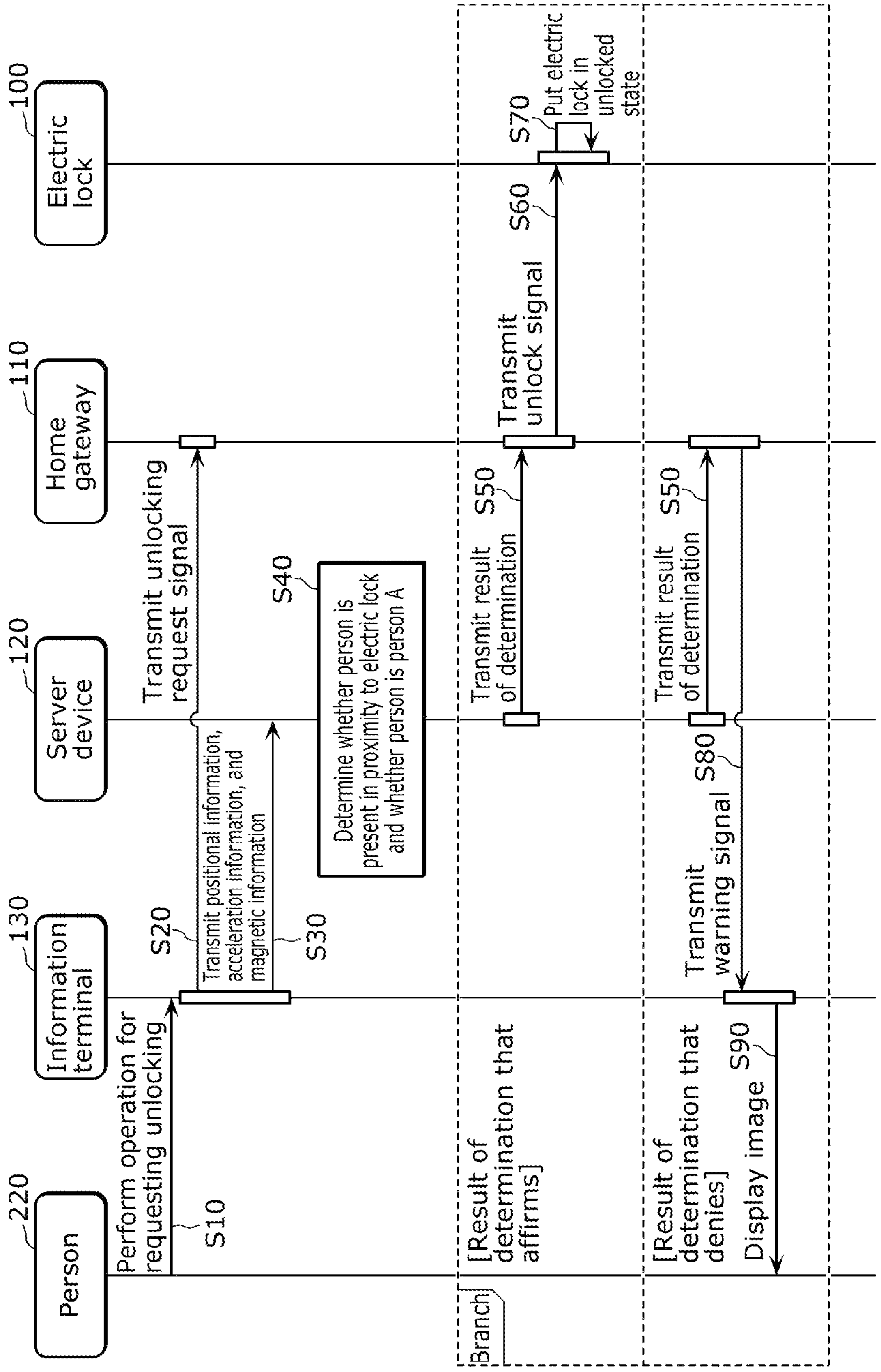
FIG. 12 is a sequence diagram illustrating an outline of one example of a typical operation performed by the electric lock control system according to Embodiment 1 that executes the first electric lock control processing.

FIG. 12 is a sequence diagram illustrating an outline of one example of a typical operation performed by electric lock control system 1 that executes the first electric lock control processing.

As illustrated in FIG. 12, when person 220 performs an operation for requesting unlocking of electric lock 100 on information terminal 130 carried by person 220 (Step S10), information terminal 130: transmits an unlocking request signal to home gateway 110 (Step S20); and transmits positional information, acceleration information, and magnetic information to server device 120 (Step S30).

When the positional information, the acceleration information, and the magnetic information have been received, server device 120 determines whether a person is present in proximity to an electric lock and whether the person is person A (Step S40), and transmits a result of the determination to home gateway 110 (Step S50).

After receiving the unlocking request, home gateway 110 (1) transmits an unlock signal (the first unlock signal or the second unlock signal) to electric lock 100 when receiving a result of determination affirming that a person is present in proximity to the electric lock and the person is person A (Step S60). Then, electric lock 100 puts electric lock 100 in an unlocked state (Step S70).

After receiving the unlocking request, home gateway 110 (2) transmits a warning signal to information terminal 130 when receiving a result of determination denying that a person is present in proximity to the electric lock and the person is person A (Step S80). Then, information terminal 130 displays an image indicating that the warning signal has been output (Step S90).

Figure 13:
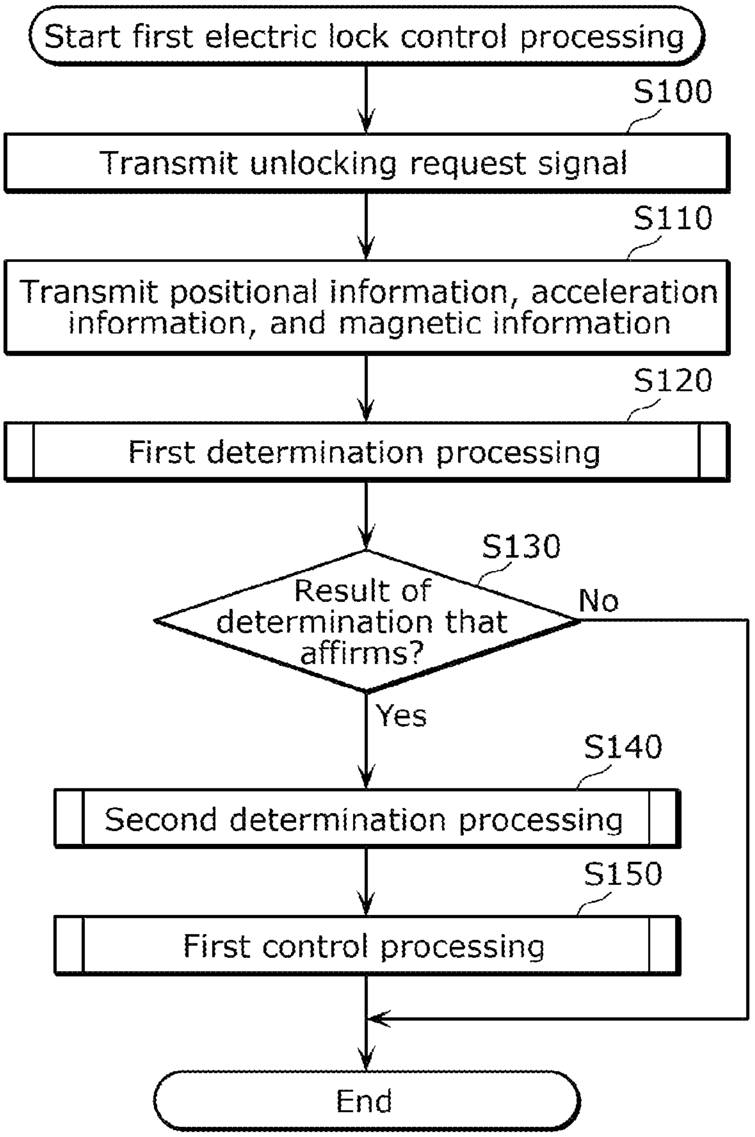
FIG. 13 is a flowchart of the first electric lock control processing.

FIG. 13 is a flowchart of the first electric lock control processing.

As illustrated in FIG. 13, after the first electric lock control processing is started, when person 220 performs the operation for requesting unlocking of electric lock 100 on information terminal 130 carried by person 220, transmitter 33 transmits an unlocking request signal to home gateway 110 (Step S100), and transmits positional information, acceleration information, and magnetic information to server device 120 (Step S110).

When receiver 21 receives the positional information, the acceleration information, and the magnetic information which have been transmitted from transmitter 33, electric lock control system 1 performs a first determination processing (Step S120).

Figure 14:
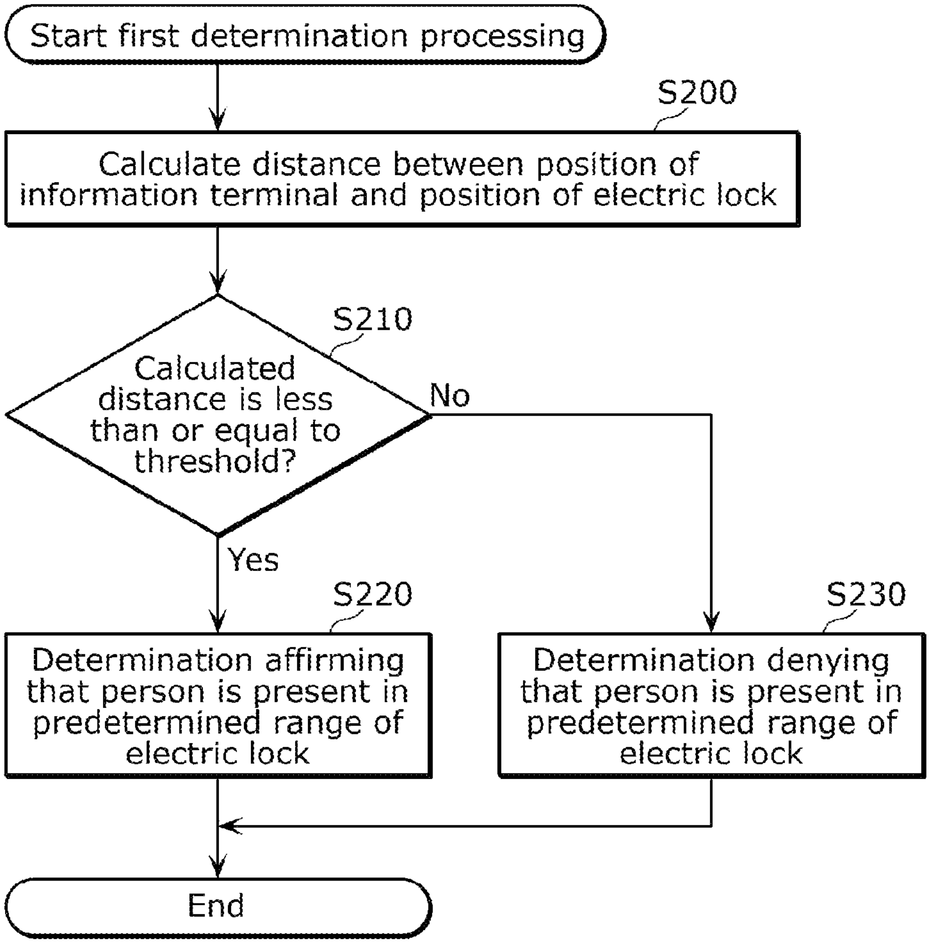
FIG. 14 is a flowchart of the first determination processing.

FIG. 14 is a flowchart of the first determination processing. The first determination processing is processing that determines whether person 220 who owns information terminal 130 is present in a predetermined range of electric lock 100, based on the positional information.

The first determination processing is started by receiving, by receiver 21, the positional information, the acceleration information, and the magnetic information which have been transmitted from transmitter 33.

As illustrated in FIG. 14, when the first determination processing is started, first determiner 22 calculates a distance between the position of information terminal 130 indicated by the positional information and the position of electric lock 100 stored in advance (Step S200), and determines whether the distance that has been calculated is less than or equal to a predetermined threshold (Step S210).

In the process of Step S210, when the distance that has been calculated is less than or equal to the predetermined threshold (Yes in Step S210), first determiner 22 makes a determination affirming that person 220 who carries information terminal 130 is present in the predetermined range surrounding electric lock 100 (Step S220).

In the process of Step S210, when the distance that has been calculated is not less than or equal to the predetermined threshold (No in Step S210), first determiner 22 makes a determination denying that person 220 who carries information terminal 130 is present in the predetermined range surrounding electric lock 100 (Step S230).

When the process of Step S220 ends, or when the process of Step S230 ends, electric lock control system 1 ends the first determination processing.

Returning again to FIG. 13, the description of the first electric lock control processing will be continued.

When the first determination processing of Step S120 ends, second determiner 23 checks whether the determination that has been made in the first determination processing is a determination affirming that person 220 who carries information terminal 130 is present in the predetermined range surrounding electric lock 100 (Step S130).

When it is determined, in the process of Step S130, that the determination that has been made in the first determination processing is a determination affirming that person 220 who carries information terminal 130 is present in the predetermined range surrounding electric lock 100 (Yes in Step S130), electric lock control system 1 performs a second determination processing (Step S140).

Figure 15:
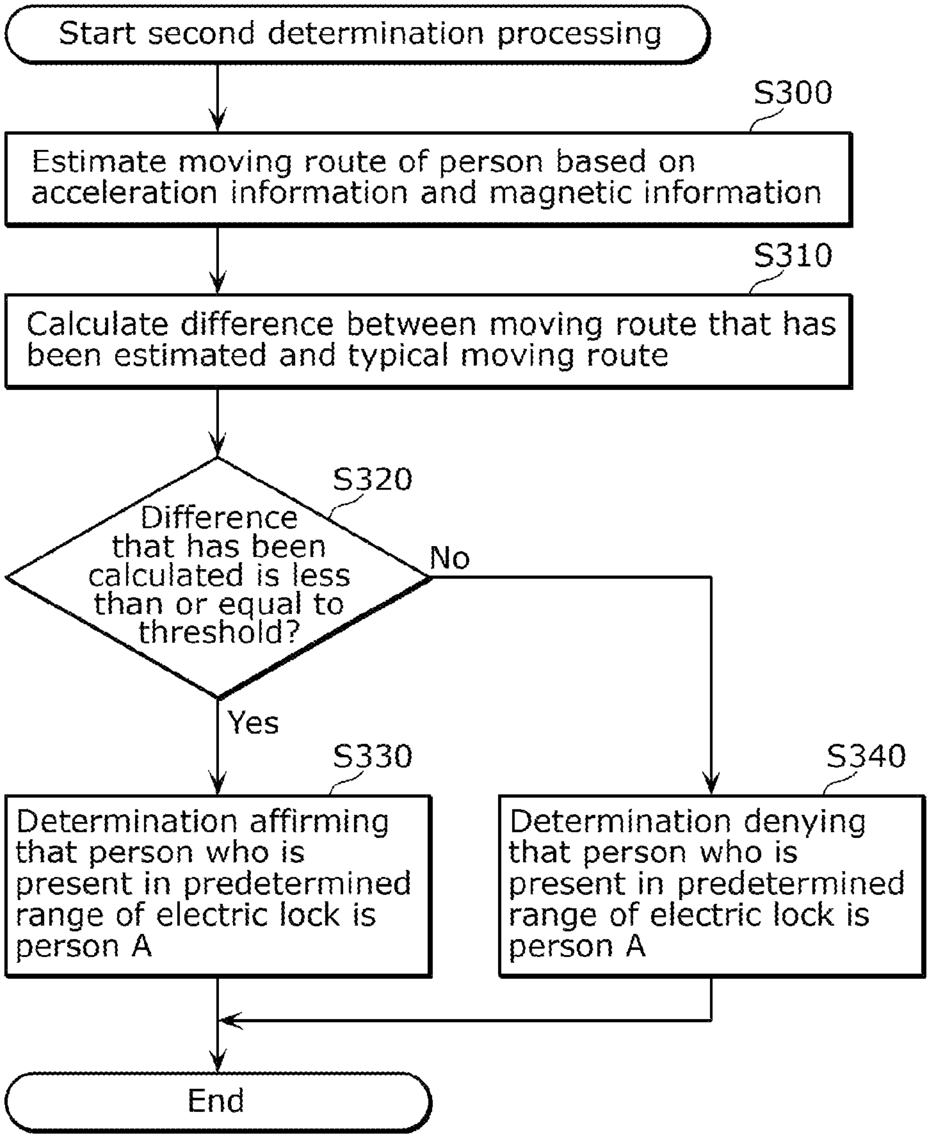
FIG. 15 is a flowchart of the second determination processing.

FIG. 15 is a flowchart of the second determination processing. The second determination processing is processing that determines, based on the acceleration information and the magnetic information, whether person 220 present in the predetermined range surrounding electric lock 100 is person A who is permitted to unlock electric lock 100.

The second determination processing is started when the determination that has been made in the first determination processing is a determination affirming that person 220 who carries information terminal 130 is present in the predetermined range surrounding electric lock 100.

As illustrated in FIG. 15, when the second determination processing is started, second determiner 23 estimates a moving route of person 220 based on the acceleration information and the magnetic information (Step S300), calculates a difference between the moving route that has been estimated and a typical moving route of person A stored in advance (Step S310), and calculates whether the difference that has been calculated is less than or equal to a predetermined threshold (Step S320).

In the process of Step S320, when the difference that has been calculated is less than or equal to the predetermined threshold (Yes in Step S320), second determiner 23 make a determination affirming that person 220 who is present in the predetermined range surrounding electric lock 100 is person A who is permitted to unlock electric lock 100 (Step S330).

In the process of Step S320, when the difference that has been calculated is not less than or equal to the predetermined threshold (No in Step S320), second determiner 23 makes a determination denying that person 220 who is present in the predetermined range surrounding electric lock 100 is person A who is permitted to unlock electric lock 100 (Step S340).

When the process of Step S330 ends, or when the process of Step S340 ends, electric lock control system 1 ends the second determination processing.

Returning again to FIG. 13, the description of the first electric lock control processing will be continued.

When the second determination processing of Step S140 ends, electric lock control system 1 performs the first control processing (Step S150).

Figure 16:
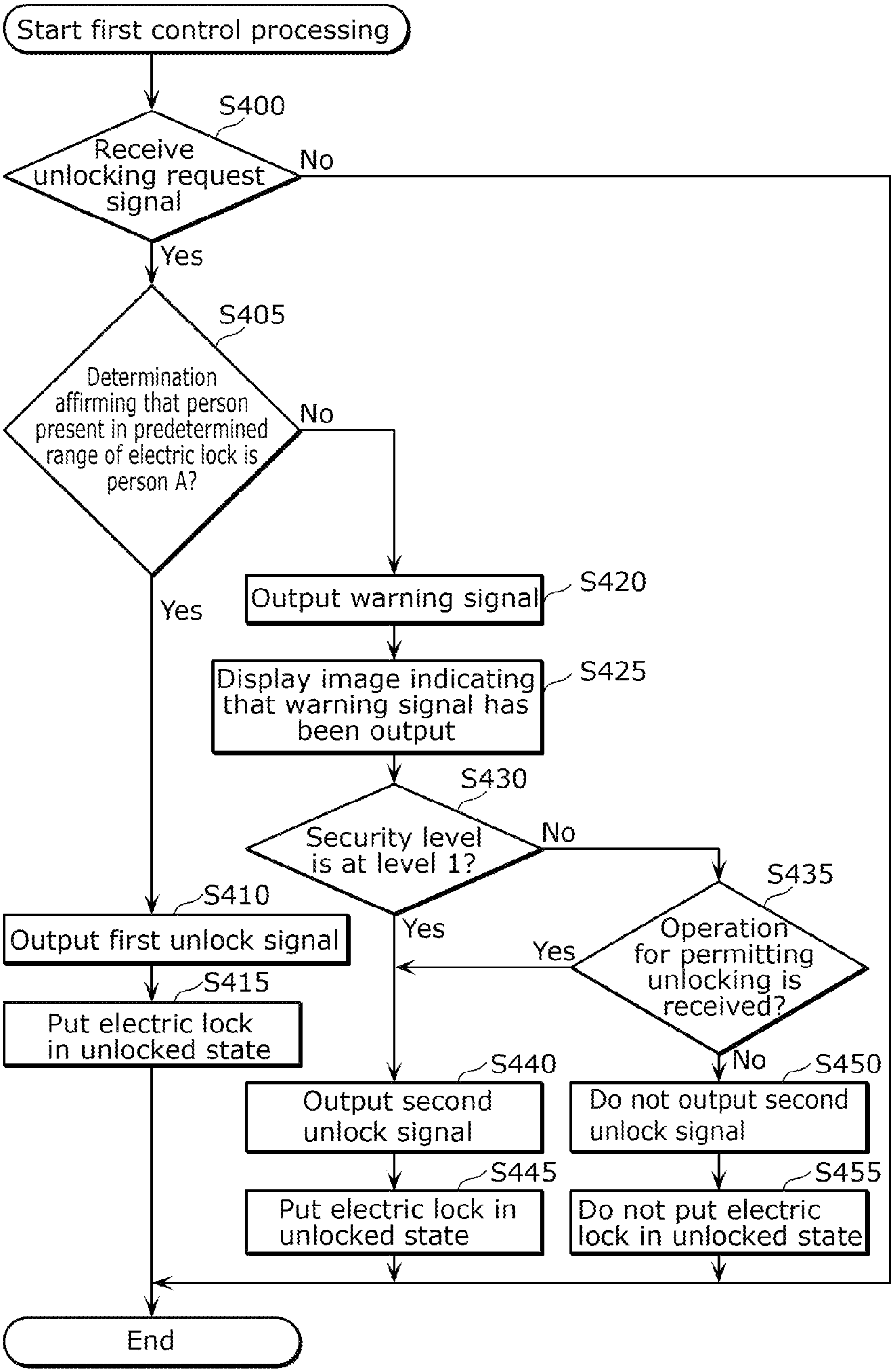
FIG. 16 is a flowchart of the first control processing.

FIG. 16 is a flowchart of the first control processing. The first control processing is processing that controls the state, which is a locked state or an unlocked state, of electric lock 100 based on a result of the determination made in the second determination processing.

The first control processing is started when the second determination processing has ended.

As illustrated in FIG. 16, when the first control processing is started, controller 12 determines whether the unlocking request signal transmitted from information terminal 130 has been received by receiver 11 (Step S400).

When it is determined that the unlocking request signal has been received by receiver 11 in the process of Step S400 (Yes in Step S400), controller 12 checks whether the result of the determination that has been made in the second determination processing is a determination affirming that person 220 present in the predetermined range surrounding electric lock 100 is person A who is permitted to unlock electric lock 100 (Step S405).

When the determination that has been made in the process of Step S405 is a determination affirming that person 220 present in the predetermined range surrounding electric lock 100 is person A who is permitted to unlock electric lock 100 (Yes in Step S405), controller 12 outputs a first unlock signal (Step S410).

When the first unlock signal is output from controller 12, transmitter 14 transmits, to electric lock 100, the first unlock signal that has been output from controller 12. Then, receiver 101 receives the first unlock signal that has been transmitted from transmitter 14. Then, lock/unlock section 102 puts electric lock 100 in an unlocked state (Step S415).

When the determination that has been made in the process of Step S405 is not a determination affirming that person 220 present in the predetermined range surrounding electric lock 100 is person A who is permitted to unlock electric lock 100 (No in Step S405), controller 12 outputs a warning signal (Step S420).

When the warning signal is output from controller 12, display and operation receiver 13 displays an image indicating that the warning signal has been output (Step S425), and transmitter 14 transmits, to information terminal 130, the warning signal that has been output from controller 12.

In addition, when receiver 34 receives a warning signal that has been transmitted from transmitter 14, display 35 displays an image indicating that the warning signal has been output.

When the image indicating that the warning signal has been output is displayed in the processing of Sep S425, display and operation receiver 13 checks whether the security level related to locking or unlocking of electric lock 100 is at level 1 (Step S430).

When the security level is not at level 1 in the process of Step S430 (No in Step S430); that is, when the security level is at level 2, display and operation receiver 13 performs a display to prompt the user of home gateway 110 to perform an operation for either permitting or not permitting unlocking of electric lock 100.

When display and operation receiver 13 receives an operation for permitting unlocking of electric lock 100 performed by the user of home gateway 110 in response to the display prompting to perform an operation for either permitting or not permitting unlocking of electric lock 100 (Yes in Step S435) or when the security level is at level 1 in the process of Step S430 (Yes in Step S430), display and operation receiver 13 outputs the second unlock signal (Step S440).

When the second unlock signal is output from display and operation receiver 13, transmitter 14 transmits, to electric lock 100, the second unlock signal that has been output from display and operation receiver 13. Then, receiver 101 receives the second unlock signal that has been transmitted from transmitter 14. Then, lock/unlock section 102 puts electric lock 100 in an unlocked state (Step S445).

When display and operation receiver 13 does not receive an operation for permitting unlocking of electric lock 100 performed by the user of home gateway 110 in response to the display prompting to perform an operation for either permitting or not permitting unlocking of electric lock 100 (No in Step S435), display and operation receiver 13 does not output the second unlock signal (Step S450). Accordingly, lock/unlock section 102 does not put electric lock 100 in an unlocked state (Step S455).

When the process of Step S415 ends, when the process of Step S445 ends, when the process of Step S455 ends, or when the unlocking request signal is not received by receiver 11 in the process of Step S400 (No in Step S400), electric lock control system 1 ends the first control processing.

Returning again to FIG. 13, the description of the first electric lock control processing will be continued.

When it is determined, in the process of Step S130, that the determination that has been made in the first determination processing is not a determination affirming that person 220 who carries information terminal 130 is present in the predetermined range surrounding electric lock 100 (No in Step S130), or when the first control processing of Step S150 ends, electric lock control system 1 ends the first electric lock control processing.

Consideration

As described above, electric lock control system 1 having the above-described configuration is capable of determining whether person 220 is person A, based on a difference between an estimated moving route of person 220 and a typical moving route of person A that has been stored in advance.

In this manner, electric lock control system 1 determines whether person 220 is present in proximity to electric lock 100 and whether person 220 is a person who is permitted to unlock electric lock 100, and controls the state, which is a locked state or an unlocked state, of the electric lock based on a result of the determination.

With this, according to electric lock control system 1, it is possible to inhibit unlocking of electric lock 100 in an unauthorized manner by a person who is not permitted to unlock electric lock 100.

It should be noted that, in Embodiment 1, it has been described that information terminal 130 transmits acceleration information to server device 120, and second determiner 23 determines, based on the acceleration information, whether person 220 is person A who is permitted to unlock electric lock 100. In contrast, as another example of the configuration, information terminal 130 may be configured to calculate step count information indicating a transition of a step count of person 220 per unit time based on the acceleration rate detected by the acceleration sensor, and to transmit, to server device 120, the step count information that has been calculated, and second determiner 23 may be configured to determine, based on the step count information, whether person 220 is person A who is permitted to unlock electric lock 100. In this case, second determiner 23 may, for example, calculate a degree of similarity between the transition of the step count of person 220 per unit time and the transition of the typical step count of person A per unit time that is stored in advance, determine that person 220 is person A when the degree of similarity that has been calculated is greater than or equal to a predetermined threshold, and determine that person 220 is not person A when the degree of similarity that has been calculated is less than the predetermined threshold.

In addition, in Embodiment 1, information terminal 130 may include an angular velocity sensor instead of including the magnetic sensor. In this case, information terminal 130 will transmit angular velocity information indicating an angular velocity detected by the angular velocity sensor. Second determiner 23 calculates a moving route of person 220 who carries information terminal 130, based on the acceleration information and the angular velocity information.

It should be noted that, in Embodiment 1, electric lock control system has been described, as one example, as having the configuration exemplified in FIG. 1. However, electric lock control system 1 need not necessarily be limited to the configuration as exemplified in FIG. 1, as long as having a configuration capable of implementing equivalent functions. For example, instead of including in-building network 150, a configuration including a first in-building network and a second in-building network, and further including a router is conceivable for electric lock control system 1. In this case, for example, the router may be connected to Internet 140 and the first in-building network, home gateway 110 may be connected to the first in-building network and the second in-building network, electric lock 100 may be connected to the second in-building network, and information terminal 130 may be connected to the first in-building network.

Variation

The following describes an electric lock control system according to a variation which has a configuration a part of which is changed from electric lock control system 1 according to Embodiment 1.

Electric lock control system 1 is one example of a system which, for unlocking electric lock 100, requires an active operation on information terminal 130 for requesting unlocking of electric lock 100.

In contrast, the electric lock control system according to the variation is one example of a system which, for unlocking electric lock 100, does not require an active operation on information terminal 130 for requesting unlocking of electric lock 100.

Here, in regard to the electric lock control system according to the variation, the same reference numerals are assigned to structural elements equivalent to the structural elements of electric lock control system 1 as such structural elements have already been described and the detailed description for such structural elements will be omitted, and description will be provided with a focus on the difference from electric lock control system 1.

Configuration

Figure 17:
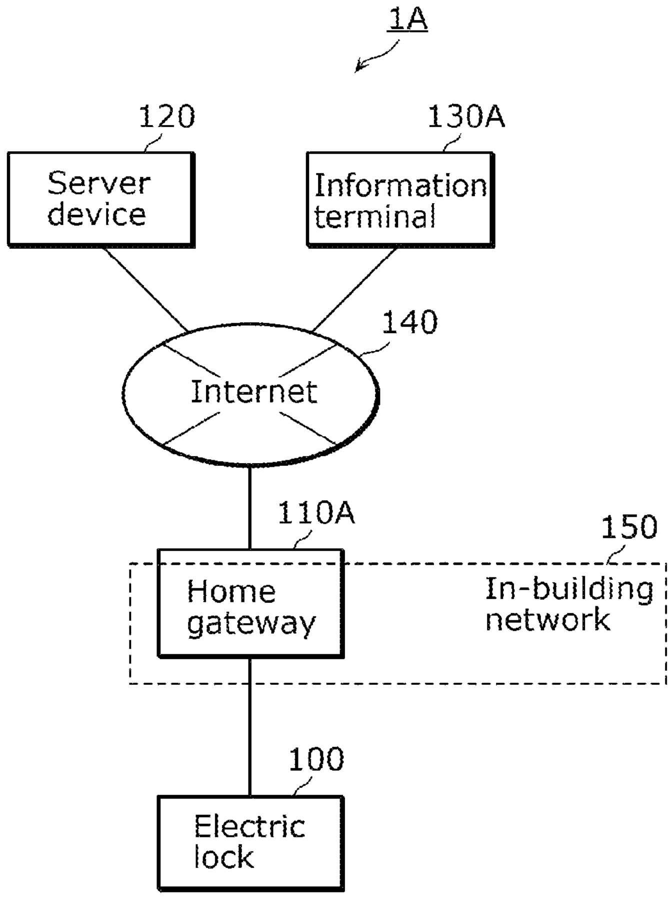
FIG. 17 is a block diagram illustrating one example of the hardware configuration of an electric lock control system according to a variation.

FIG. 17 is a block diagram illustrating one example of the hardware configuration of electric lock control system 1A according to the variation.

As illustrated in FIG. 17, electric lock control system 1A has a configuration in which home gateway 110 of electric lock control system 1 according to Embodiment 1 is changed to home gateway 110A, and information terminal 130 of electric lock control system 1 according to Embodiment 1 is changed to information terminal 130A.

Home gateway 110A is equivalent to home gateway 110 in its hardware configuration, but part of the software to be executed has been changed from home gateway 110. For this reason, some of the functions implemented by home gateway 110A have been changed from the functions implemented by home gateway 110.

Information terminal 130A is equivalent to information terminal 130 in its hardware configuration, but part of the software to be executed has been changed from information terminal 130. For this reason, some of the functions implemented by information terminal 130A have been changed from the functions implemented by information terminal 130.

Information terminal 130A is carried by person 220 in the same manner as information terminal 130.

Figure 18:
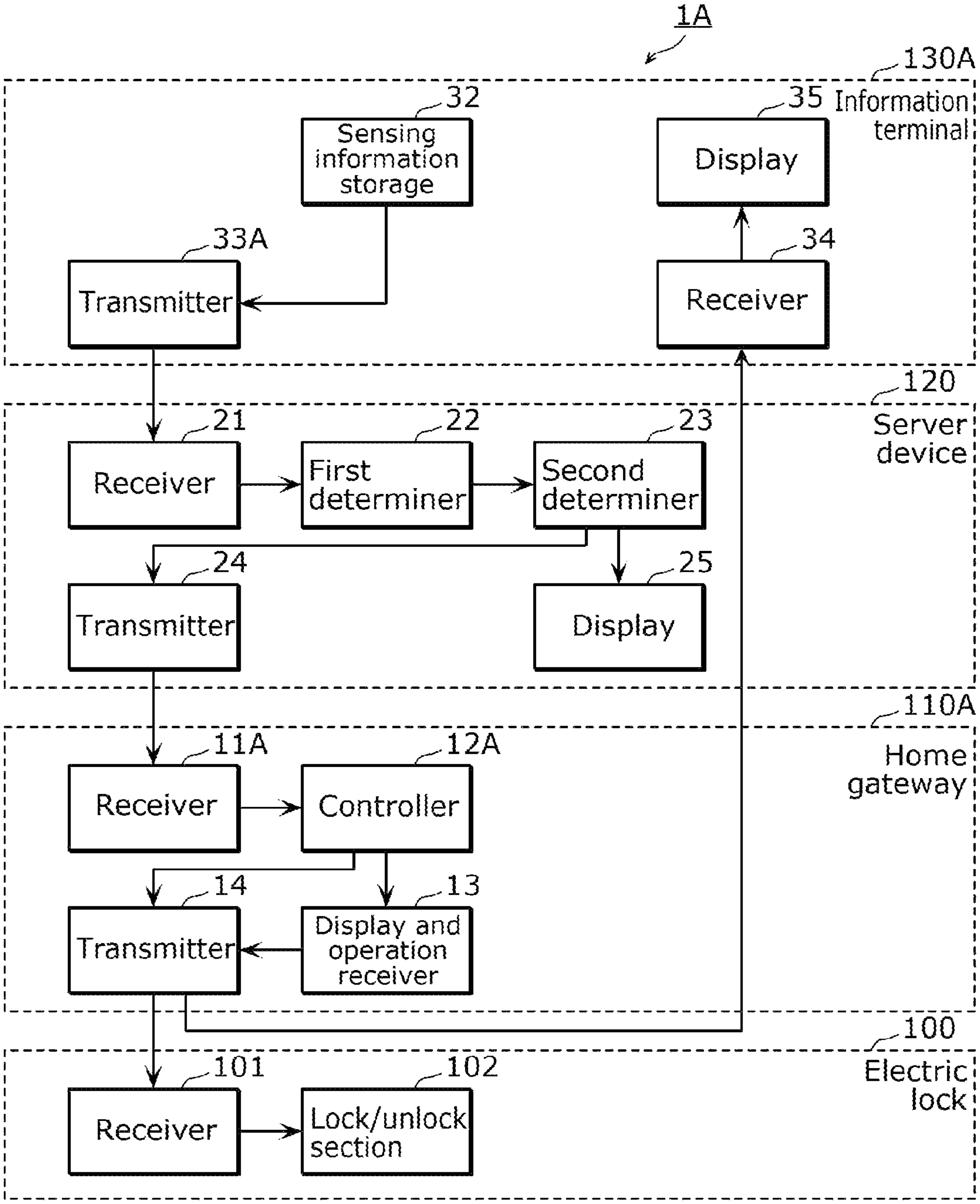
FIG. 18 is a block diagram illustrating one example of a functional configuration of the electric lock control system according to the variation.

FIG. 18 is a block diagram illustrating one example of the functional configuration of electric lock control system 1A.

As illustrated in FIG. 18, electric lock control system 1A has a configuration in which, from the configuration of electric lock control system 1, operation receiver 31 is deleted, transmitter 33 is changed to transmitter 33A, receiver 11 is changed to receiver 11A, and controller 12 is changed to controller 12A.

Transmitter 33A transmits to server device 120, for each predetermined period T3 (e.g., one minute), positional information indicating the position of information terminal 130A at this point in time, acceleration information indicating the acceleration rate detected by the acceleration sensor in predetermined period T2 from this point in time to the past, and magnetic information indicating the magnetism detected by the magnetic sensor in predetermined period T2 from this point in time to the past.

Receiver 11A receives determination result information transmitted from server device 120.

Controller 12A controls a state, which is a locked state or an unlocked state, of electric lock 100 based on a result of the determination performed by second determiner 23.

More specifically, in the case where receiver 11A receives determination result information from server device 120, controller 12A: outputs a first unlock signal indicating that electric lock 100 is to be put in an unlocked state when the determination result information that has been received indicates that it is determined that person 220 is person A; and outputs a warning signal without outputting the first unlock signal when the determination result information that has been received indicates that it is determined that person 220 is not person A, thereby controlling the state, which is a locked state or an unlocked state, of electric lock 100.

Operation

The following describes an operation performed by electric lock control system 1A which has the above-described configuration.

Electric lock control system 1A performs a second electric lock control processing in which some processes are changed from the first electric lock control processing according to Embodiment 1.

The first electric lock control processing is processing that requires, for unlocking electric lock 100, an active operation on information terminal 130A for requesting unlocking of electric lock 100. On the other hand, the second electric lock control processing is processing that does not require, for unlocking electric lock 100, an active operation on information terminal 130A for requesting unlocking of electric lock 100.

Figure 19:
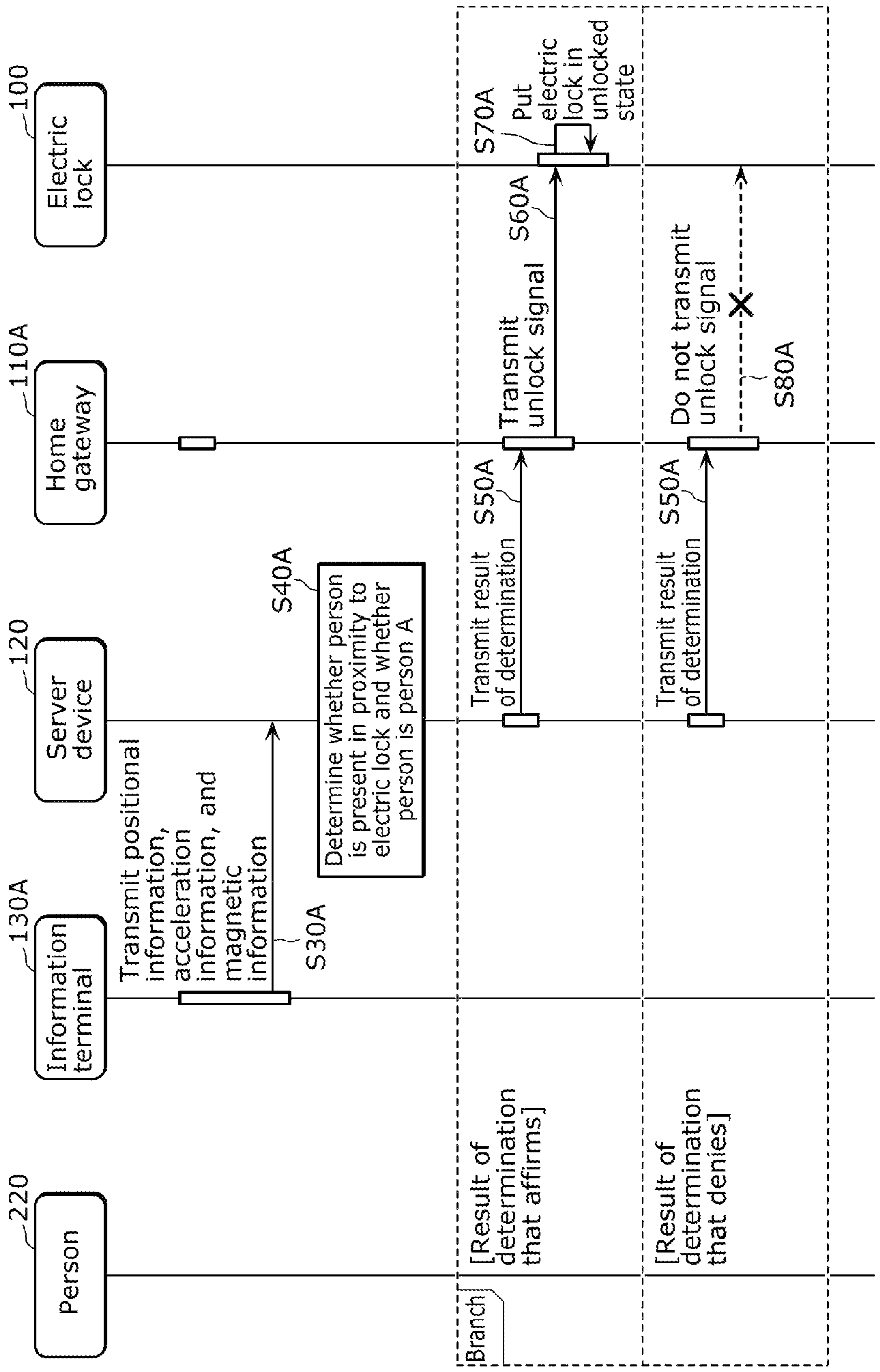
FIG. 19 is a sequence diagram illustrating an outline of one example of a typical operation performed by the electric lock control system according to the variation that executes the second electric lock control processing.

FIG. 19 is a sequence diagram illustrating an outline of one example of a typical operation performed by electric lock control system 1A that executes the second electric lock control processing.

As illustrated in FIG. 19, information terminal 130A carried by person 220 transmits, for each predetermined period T3, positional information, acceleration information, and magnetic information to server device 120 (Step S30A).

When the positional information, the acceleration information, and the magnetic information have been received, server device 120 determines whether a person is present in proximity to an electric lock and whether the person is person A (Step S40A), and transmits a result of the determination to home gateway 110A (Step S50A).

Home gateway 110A (1) transmits an unlock signal (the first unlock signal or the second unlock signal) to electric lock 100 when receiving a result of determination affirming that a person is present in proximity to the electric lock and the person is person A (Step S60A). Then, electric lock 100 puts electric lock 100 in an unlocked state (Step S70A).

Home gateway 110A (2) does not transmit an unlock signal (the first unlock signal or the second unlock signal) to electric lock 100 when receiving a result of determination denying that a person is present in proximity to the electric lock and the person is person A (Step S80A). Accordingly, electric lock 100 does not put electric lock 100 in an unlocked state.

Figure 20:
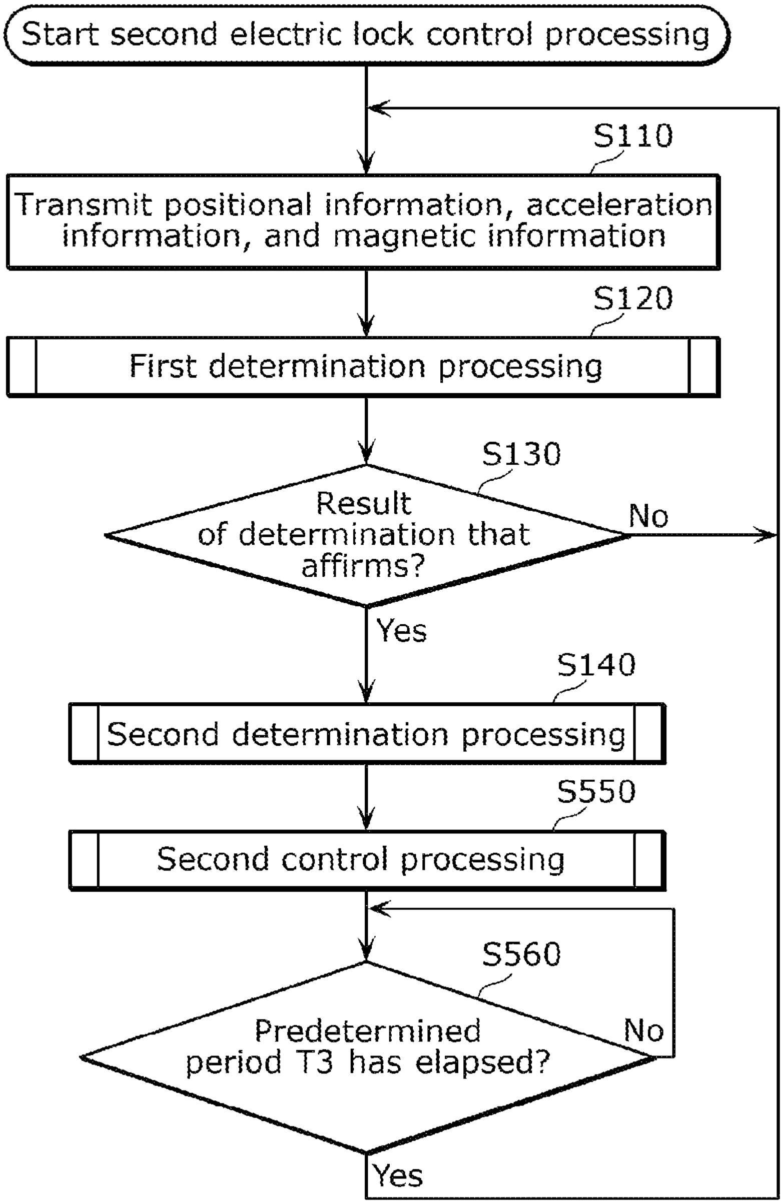
FIG. 20 is a flowchart of the second electric lock control processing.

FIG. 20 is a flowchart of the second electric lock control processing.

As illustrated in FIG. 20, the second electric lock control processing is processing in which, from the first electric lock control processing according to Embodiment 1: Step S100 is deleted; the first control processing in Step S150 is changed to the second control processing in Step S550; the process of Step S560 is added; and a loop path from No in Step S130 to Step S110 and the loop path from Yes in Step S560 to Step S110 are added.

As illustrated in FIG. 20, when the second electric lock control processing is started, transmitter 33A transmits positional information, acceleration information, and magnetic information to server device 120 (Step S110).

When receiver 21 receives the positional information, the acceleration information, and the magnetic information which have been transmitted from transmitter 33A, electric lock control system 1A performs the first determination processing (Step S120).

When the first determination processing of Step S120 ends, the second electric lock control processing proceeds to the processing of Step S130.

When it is determined, in the process of Step S130, that the determination that has been made in the first determination processing is a determination affirming that that person 220 who carries information terminal 130A is present in the predetermined range surrounding electric lock 100 (Yes in Step S130), the second electric lock control processing proceeds to the second determination processing (Step S140).

When the second determination processing of Step S140 ends, the second electric lock control processing proceeds to the second control processing (Step S550).

Figure 21:
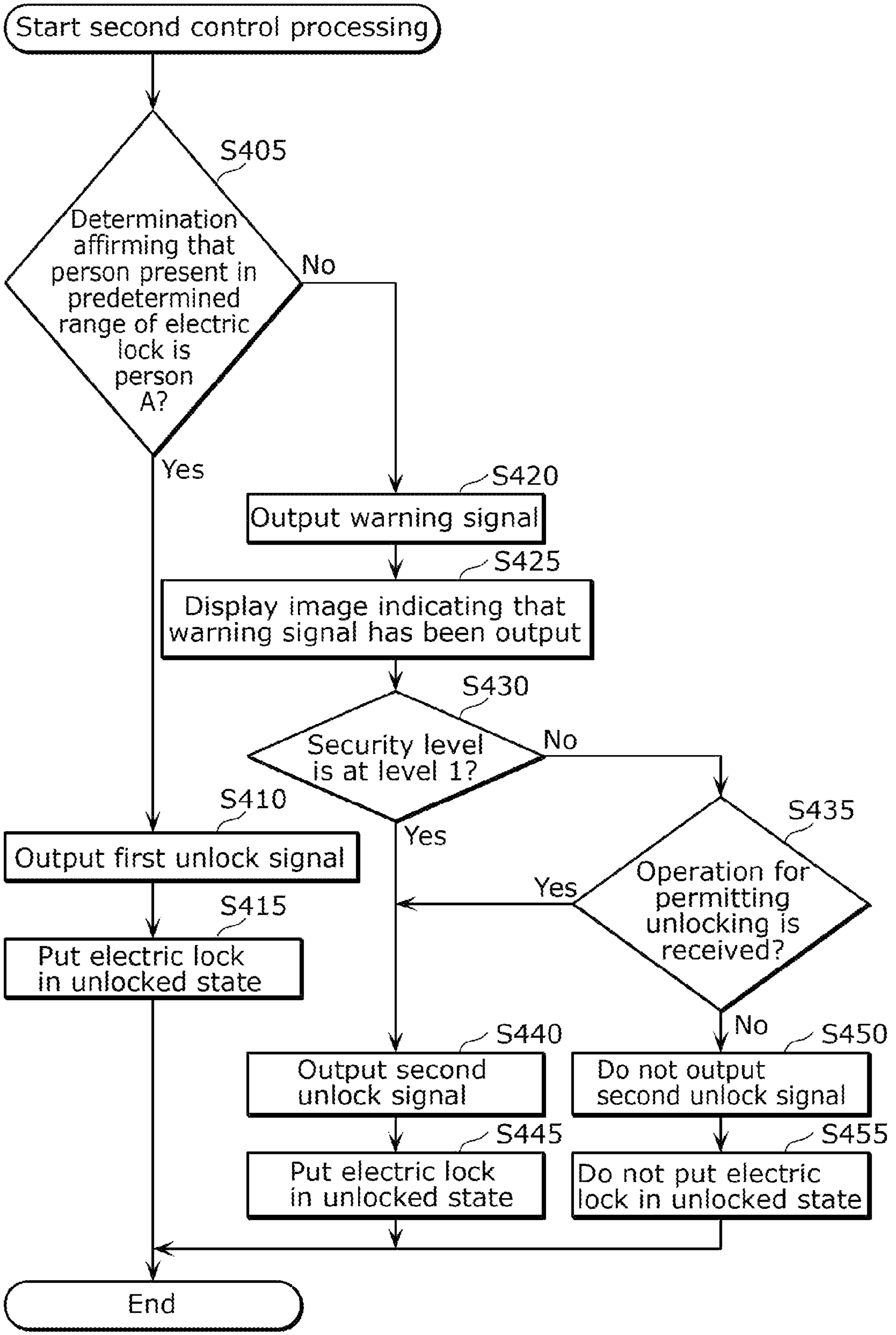
FIG. 21 is a flowchart of the second control processing.

FIG. 21 is a flowchart of the second control processing.

As illustrated in FIG. 21, the second control processing is processing in which the process of Step S400 is deleted from the first control processing according to Embodiment 1. For this reason, since the description of the second control processing has already been provided, the description will be omitted here.

Returning again to FIG. 20, the description of the second electric lock control processing will be continued.

When the second control processing of Step S550 ends, transmitter 33A checks whether predetermined period T3 has elapsed since the transmission of the positional information, the acceleration information, and the magnetic information in the previously executed process of Step S110 (Step S560).

In the process of Step S560, when predetermined period T3 has not elapsed (No in Step S560), transmitter 33A waits (i.e., repeats Step S560) until predetermined period T3 elapses.

When predetermined period T3 has elapsed (Yes in Step S560 after repeating Step S560) in the process of Step S560, and when it is determined in the process of Step S130, that the determination that has been made in the first determination processing is not a determination affirming that person 220 who carries information terminal 130A is present in the predetermined range surrounding electric lock 100 (No in Step S130), the second electric lock control processing proceeds to the process of Step S110.

Consideration

As described above, electric lock control system 1A having the configuration described above determines whether person 220 is present in proximity to electric lock 100 and whether person 220 is a person who is permitted to unlock electric lock 100, and controls the state, which is a locked state or an unlocked state, of the electric lock based on a result of the determination, even without performing an active operation for requesting unlocking of electric lock 100, in the same manner as electric lock control system 1 according to Embodiment 1.

In this manner, according to electric lock control system 1A, it is possible to inhibit unlocking of electric lock 100 in an unauthorized manner by a person who is not permitted to unlock electric lock 100, as with electric lock control system 1 according to Embodiment 1.

Embodiment 2

The following describes an electric lock control system according to Embodiment 2 which has a configuration a part of which is changed from electric lock control system 1 according to Embodiment 1.

Electric lock control system 1 has been described as one example of a system that: determines whether person 220 is present in a predetermined range surrounding electric lock 100 based on positional information; and determines whether person 220 is person A based on acceleration information.

In contrast, the electric lock control system according to Embodiment 2 is one example of a system that: determines whether person 220 is present in a predetermined range surrounding electric lock 100 based on an image captured by an imaging device; and determines whether person 220 is person A based on gait information related to a gait of person 220 which is calculated based on the image captured by the imaging device.

Here, in regard to the electric lock control system according to Embodiment 2, the same reference numerals are assigned to structural elements equivalent to the structural elements of electric lock control system 1 as such structural elements have already been described and the detailed description for such structural elements will be omitted, and description will be provided with a focus on the difference from electric lock control system 1.

Configuration

Figure 22:
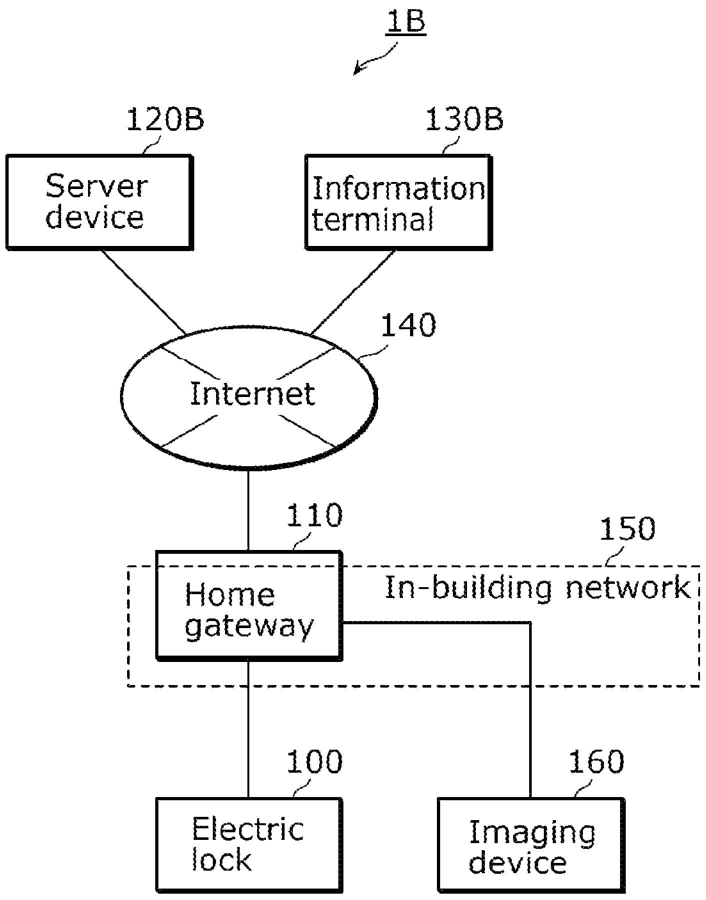
FIG. 22 is a block diagram illustrating one example of a hardware configuration of the electric lock control system according to Embodiment 2.

FIG. 22 is a block diagram illustrating one example of the hardware configuration of electric lock control system 1B according to Embodiment 2.

Figure 23:
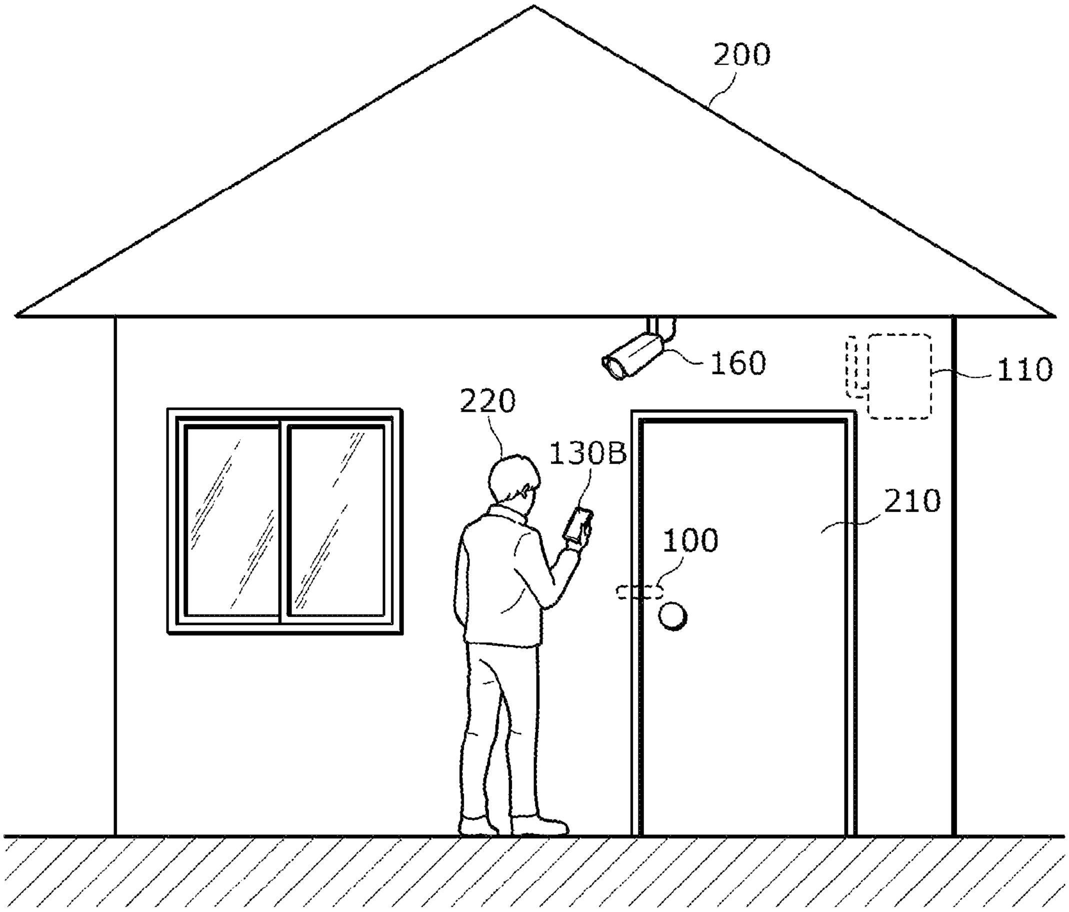
FIG. 23 is diagram schematically illustrating a portion of the hardware configuration of the electric lock control system according to Embodiment 2 provided to a building.

FIG. 23 is a diagram schematically illustrating a portion of the hardware configuration of electric lock control system 1B provided to building 200.

As illustrated in FIG. 22, electric lock control system 1B has a configuration in which, from the configuration of electric lock control system 1 according to Embodiment 1, server device 120 is changed to server device 120B, information terminal 130 is changed to information terminal 130B, and imaging device 160 is added.

Server device 120B is equivalent to server device 120 in its hardware configuration, but part of the software to be executed has been changed from server device 120. For this reason, some of the functions implemented by server device 120B have been changed from the functions implemented by server device 120.

Information terminal 130B is equivalent to information terminal 130 in its hardware configuration, but part of the software to be executed has been changed from information terminal 130. For this reason, some of the functions implemented by information terminal 130B have been changed from the functions implemented by information terminal 130.

Information terminal 130B is carried by person 220 in the same manner as information terminal 130.

As illustrated in FIG. 23, imaging device 160 is provided to building 200 and captures a predetermined range surrounding electric lock 100. Imaging device 160 is connected to in-building network 150, and transmits the image that has been captured to home gateway 110.

Imaging device 160 may be, for example, a monitoring camera or a camera built into a camera-equipped intercom provided in proximity to door 210.

Figure 24:
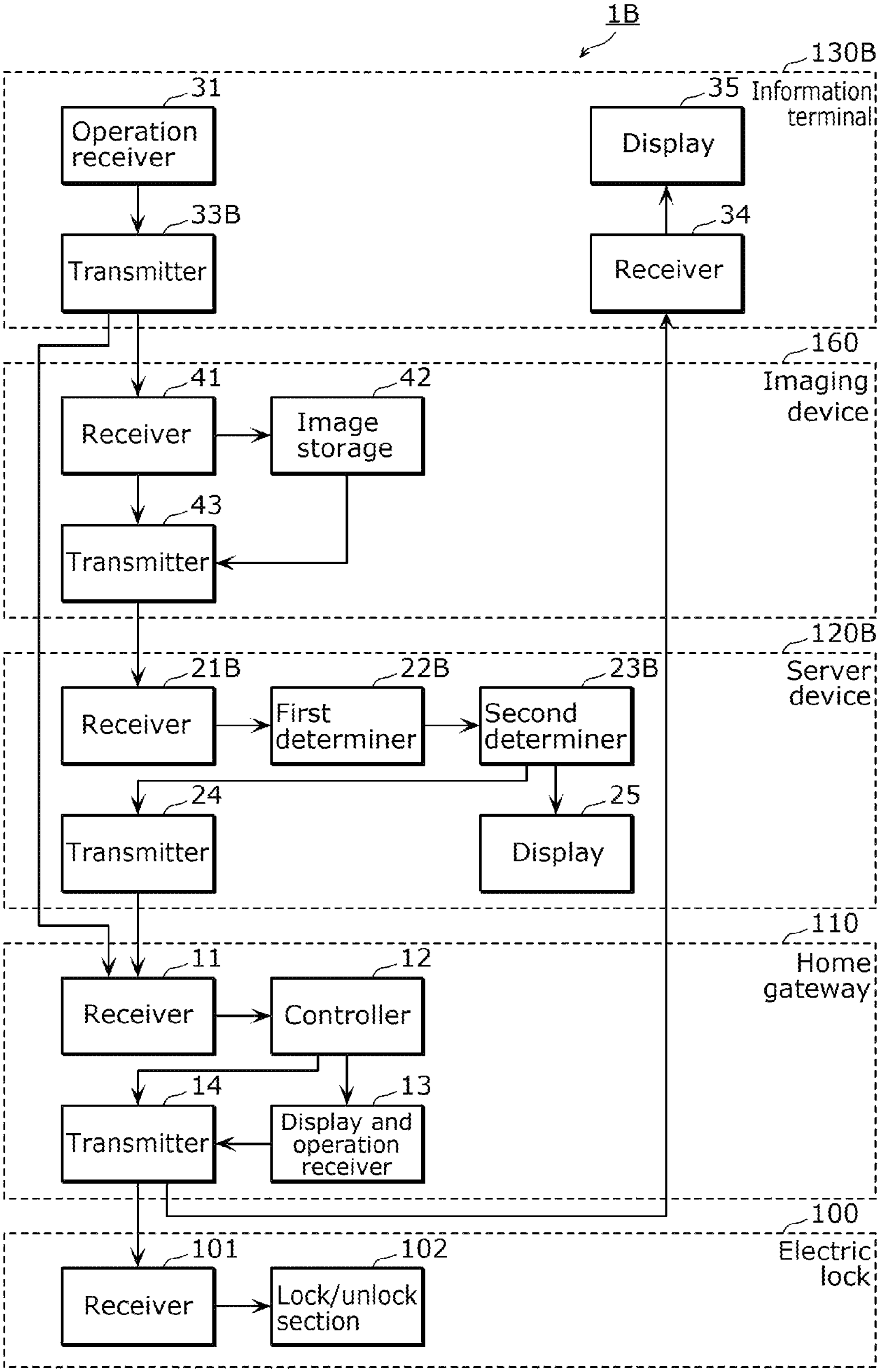
FIG. 24 is a block diagram illustrating one example of a functional configuration of the electric lock control system according to Embodiment 2.

FIG. 24 is a block diagram illustrating one example of the functional configuration of electric lock control system 1B.

As illustrated in FIG. 24, electric lock control system 1B has a configuration in which, from electric lock control system 1, sensing information storage 32 is deleted, transmitter 33 is changed to transmitter 33B, receiver 21 is changed to receiver 21B, first determiner 22 is changed to first determiner 22B, second determiner 23 is changed to second determiner 23B, and receiver 41, image storage 42, and transmitter 43 are added.

Receiver 41, image storage 42, and transmitter 43 are implemented by imaging device 160.

Transmitter 33B transmits an unlocking request signal to imaging device 160 and home gateway 110 when operation receiver 31 receives an operation for requesting unlocking of electric lock 100 from a user of information terminal 130B.

Receiver 41 receives the unlocking request signal transmitted by information terminal 130B.

Image storage 42 stores the image captured by imaging device 160. Imaging device 160 may, for example, capture an image for each 0.1 second, and image storage 42 may, for example, store an image captured in a period of 24 hours from this point in time to the past.

When receiver 41 receives an unlocking request signal from information terminal 130B, transmitter 43 refers to the images stored in image storage 42 and transmits an image captured in predetermined period T4 from this point in time to the past (e.g., one minute) to server device 120B.

Receiver 21B receives the image transmitted by imaging device 160.

When receiver 21B receives the image from imaging device 160, first determiner 22B determines, based on the received image, whether person 220 who carries information terminal 130B is present in a predetermined range surrounding electric lock 100 (e.g., in a rage within two meters from electric lock 100).

First determiner 22B may, for example, make a determination affirming that person 220 who carries information terminal 130B is present in a predetermined range surrounding electric lock 100 when the latest image among the images received by receiver 21B shows a person, and make a determination denying that person 220 who carries information terminal 130B is present in the predetermined range surrounding electric lock 100 when the latest image does not show a person.

When first determiner 22B has determined that person 220 who carries information terminal 130B is present in the predetermined range surrounding electric lock 100, second determiner 23B determines, based on the image received by receiver 21B, whether person 220 is person A who is permitted to unlock electric lock 100.

Second determiner 23B may, for example: calculate a feature of the gait of person 220 based on the image received by receiver 21B; calculate the difference between the calculated feature of the gait and a feature of the typical gait of person A stored in advance; and determine that person 220 is person A when the calculated difference is less than or equal to a predetermined threshold, and that that person 220 is not person A when the difference is greater than the predetermined threshold.

Operation

The following describes an operation performed by electric lock control system 1B which has the above-described configuration.

Electric lock control system 1B performs a third electric lock control processing in which some processes are changed from the first electric lock control processing according to Embodiment 1.

The first electric lock control processing is processing that determines whether person 220 is present in a predetermined range surrounding electric lock 100 based on the positional information, and determines whether person 220 is person A based on the acceleration information. In contrast, the third electric lock control processing is processing that determines whether person 220 is present in a predetermined range surrounding electric lock 100 based on the image captured by imaging device 160, and determines whether person 220 is person A based on gait information related to the gait of person 220 calculated based on the images captured by imaging device 160.

Figure 25:
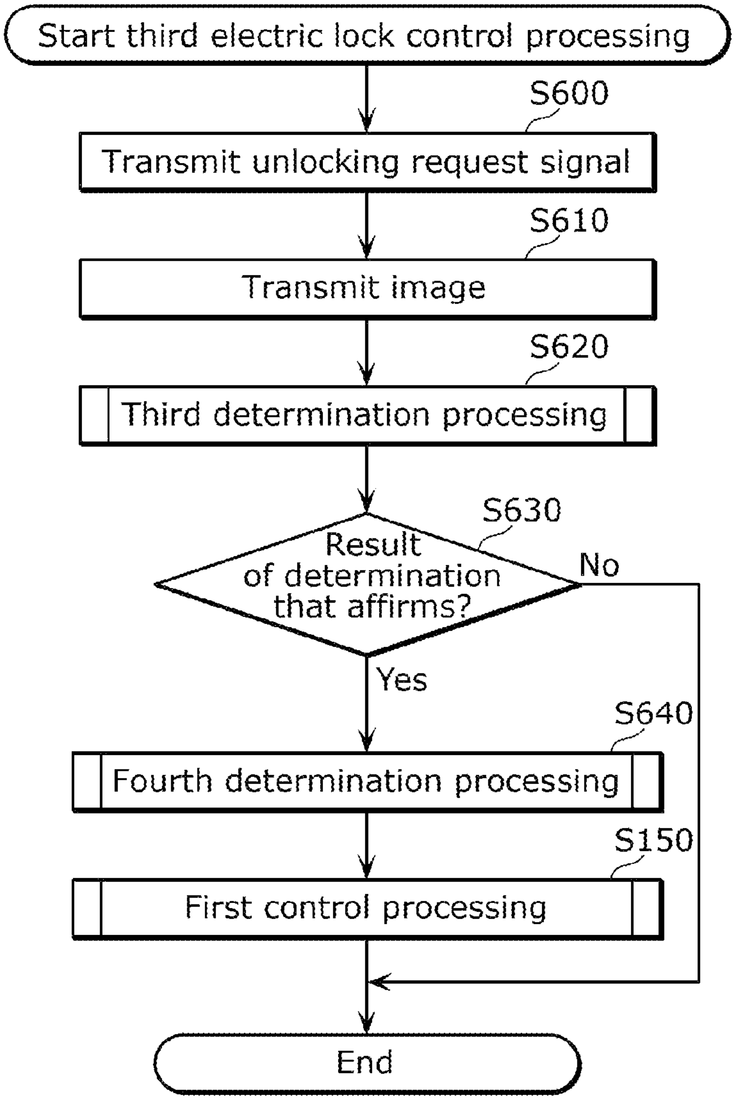
FIG. 25 is a flowchart of the third electric lock control processing.

FIG. 25 is a flowchart of the third electric lock control processing.

As illustrated in FIG. 25, the third electric lock control processing is processing in which, from the first electric lock control processing according to Embodiment 1: the process of Step S100 is changed to the process of Step S600; the process of Step S110 is changed to the process of Step S610; the process of Step S120 is changed to the process of Step S620; the process of Step S130 is changed to the process of Step S630; and the process of Step S140 is changed to the process of Step S640.

As illustrated in FIG. 25, after the third electric lock control processing is started, when person 220 performs an operation for requesting unlocking of electric lock 100 on information terminal 130B that person 220 carries, transmitter 33B transmits an unlocking request signal to home gateway 110 and imaging device 160 (Step S600).

When receiver 41 receives the unlocking request signal transmitted from information terminal 130B, transmitter 43 transmits, to server device 120B, an image captured in predetermined period T4 from this point in time to the past (Step S610).

When receiver 21B receives the image transmitted from imaging device 160, electric lock control system 1B executes the third determination processing (Step S620).

Figure 26:
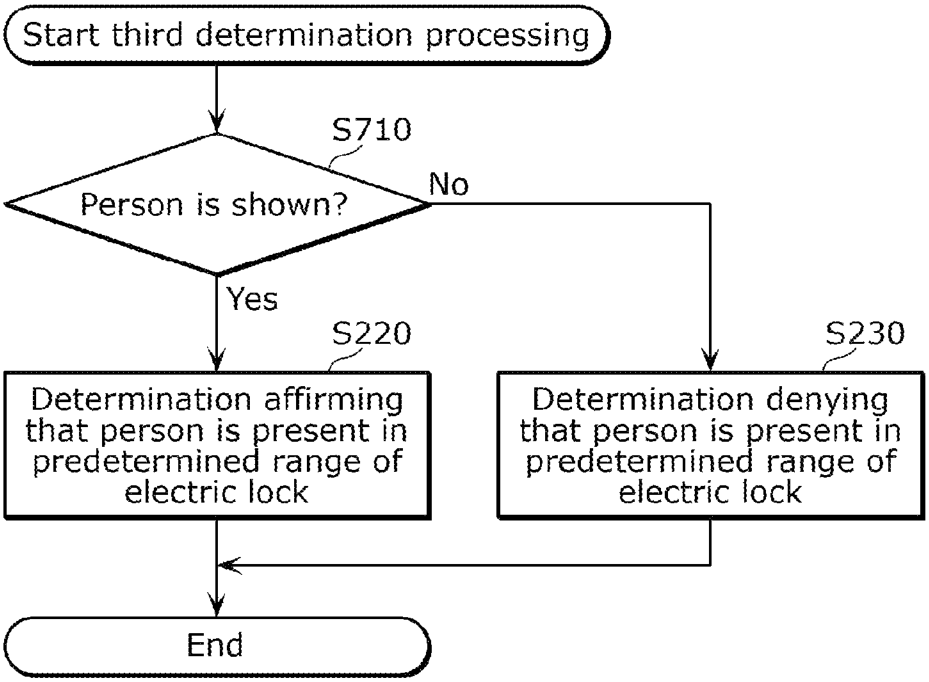
FIG. 26 is a flowchart of the third determination processing.

FIG. 26 is a flowchart of the third determination processing.

As illustrated in FIG. 26, the third determination processing is processing in which, from the first determination processing according to Embodiment 1, the process of Step S200 is deleted, and the process of Step S210 is changed to the process of Step S710.

The third determination processing is started by receiving, by receiver 21B, the image transmitted from imaging device 160.

As illustrated in FIG. 26, when the third determination processing is started, first determiner 22B determines whether the latest image among the images received by receiver 21B shows a person (Step S710).

In the process of Step S710, when the latest image among the images received by receiver 21B shows a person (Yes in Step S710), the third determination processing proceeds to the process of Step S220.

In the process of Step S710, when the latest image among the images received by receiver 21B does not show a person (No in Step S710), the third determination processing proceeds to the process of Step S230.

When the process of Step S220 ends, or when the process of Step S230 ends, electric lock control system 1B ends the third determination processing.

Returning again to FIG. 25, the description of the third electric lock control processing will be continued.

When the third determination processing of Step S620 ends, second determiner 23B checks whether the determination that has been made in the third determination processing is a determination affirming that person 220 who carries information terminal 130B is present in a predetermined range surrounding electric lock 100 (Step S630).

When, in the processing of Step S630, the determination that has been made in the third determination processing is the determination affirming that person 220 who carries information terminal 130B is present in the predetermined range surrounding electric lock 100 (Yes in Step S630), electric lock control system 1B performs a fourth determination processing (Step S640).

Figure 27:
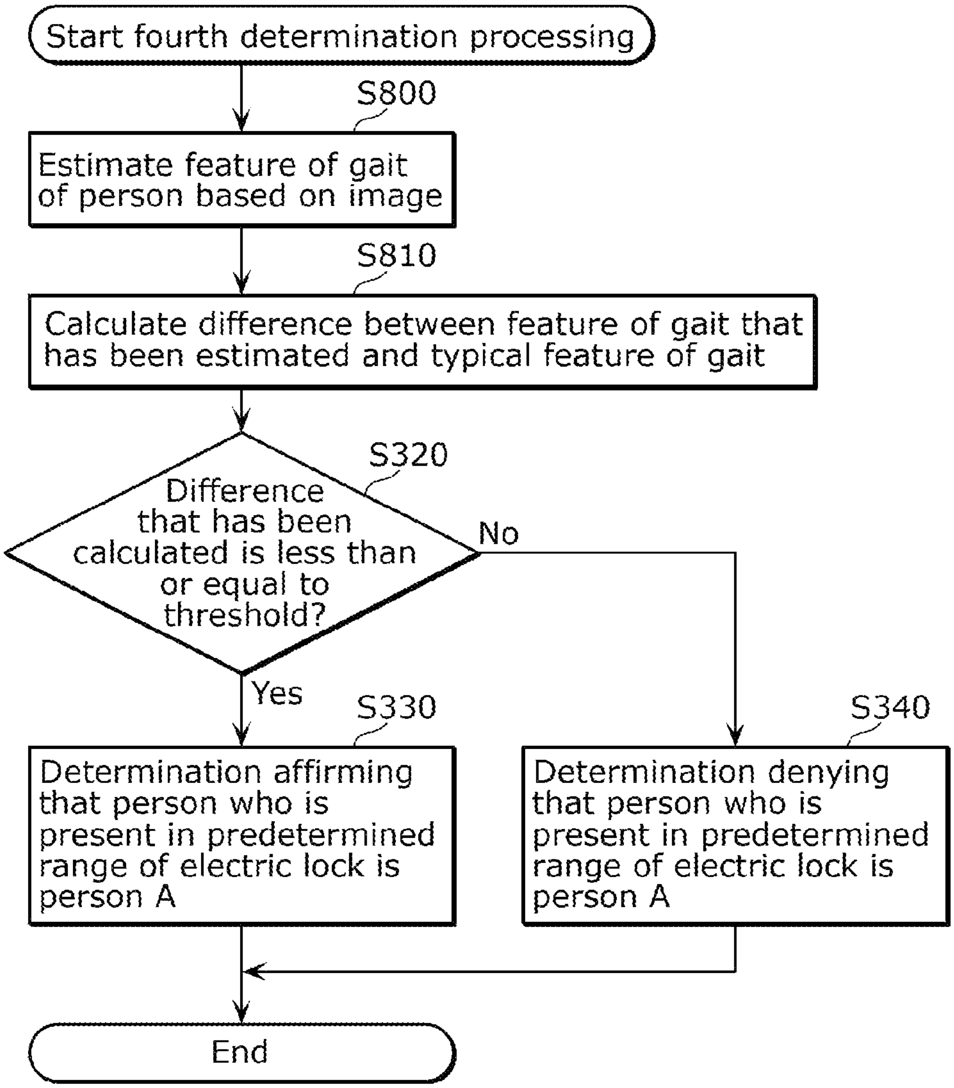
FIG. 27 is a flowchart of the fourth determination processing.

FIG. 27 is a flowchart of the fourth determination processing.

As illustrated in FIG. 27, the fourth determination processing is processing in which, from the second determination processing according to Embodiment 1, the process of Step S300 is changed to the process of Step S800, and the process of Step S310 is changed to the process of Step S810.

As illustrated in FIG. 27, when the fourth determination processing is started, second determiner 23B: calculates a feature of the gait of person 220 based on the image received by receiver 21B (Step S800); and calculates the difference between the calculated feature of the gait and a feature of the typical gait of person A stored in advance (Step S810). Then, the fourth determination processing proceeds to the process of Step S320.

When the process of Step S330 ends, or when the process of Step S340 ends, electric lock control system 1B ends the fourth determination processing.

Returning again to FIG. 25, the description of the third electric lock control processing will be continued.

When the fourth determination processing of Step S640 ends, the third electric lock control processing proceeds to the first control processing (Step S150).

When, in the processing of Step S630, the determination that has been made in the third determination processing is not a determination affirming that person 220 who carries information terminal 130B is present in the predetermined range surrounding electric lock 100 (No in Step S630), or when the first control processing of Step S150 ends, electric lock control system 1B ends the third electric lock control processing.

Consideration

As described above, electric lock control system 1B is capable of determining whether person 220 is person A, based on the difference between a calculated feature of the gait of person 220 and a feature of the typical gait of person A stored in advance.

In this manner, electric lock control system 1B determines whether person 220 is present in proximity to electric lock 100 and whether person 220 is a person who is permitted to unlock electric lock 100, and controls the state, which is a locked state or an unlocked state, of the electric lock based on a result of the determination, in the same manner as electric lock control system 1 according to Embodiment 1.

Thus, according to electric lock control system 1B, it is possible to inhibit unlocking of electric lock 100 in an unauthorized manner by a person who is not permitted to unlock electric lock 100, as with electric lock control system 1 according to Embodiment 1.

Embodiment 3

The following describes an electric lock control system according to Embodiment 3 which has a configuration a part of which is changed from electric lock control system 1 according to Embodiment 1.

Electric lock control system 1 has been described as one example of a system that: determines whether person 220 is present in a predetermined range surrounding electric lock 100 based on positional information; and determines whether person 220 is person A based on acceleration information.

In contrast, the electric lock control system according to Embodiment 3 is one example of a system that: determines whether person 220 is present in a predetermined range surrounding electric lock 100 based on connection information indicating that an electric vehicle which a person uses has been connected to a battery charger; and determines whether person 220 is person A based on acceleration information.

Here, in regard to the electric lock control system according to Embodiment 3, the same reference numerals are assigned to structural elements equivalent to the structural elements of electric lock control system 1 as such structural elements have already been described and the detailed description for such structural elements will be omitted, and description will be provided with a focus on the difference from electric lock control system 1.

Configuration

Figure 28:
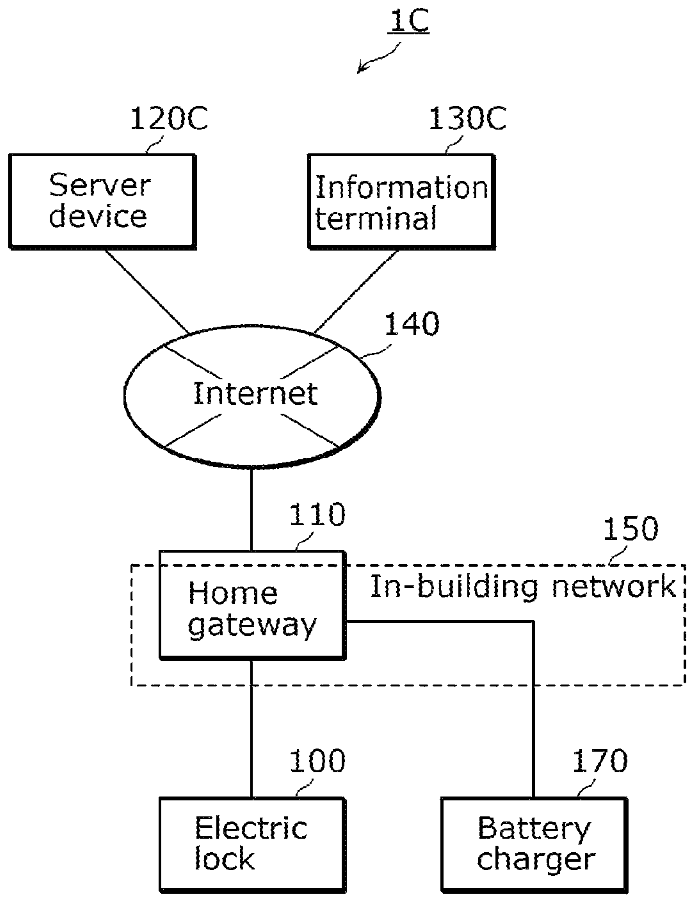
FIG. 28 is a block diagram illustrating one example of a hardware configuration of an electric lock control system according to Embodiment 3.

FIG. 28 is a block diagram illustrating one example of the hardware configuration of electric lock control system 1C according to Embodiment 3.

Figure 29:
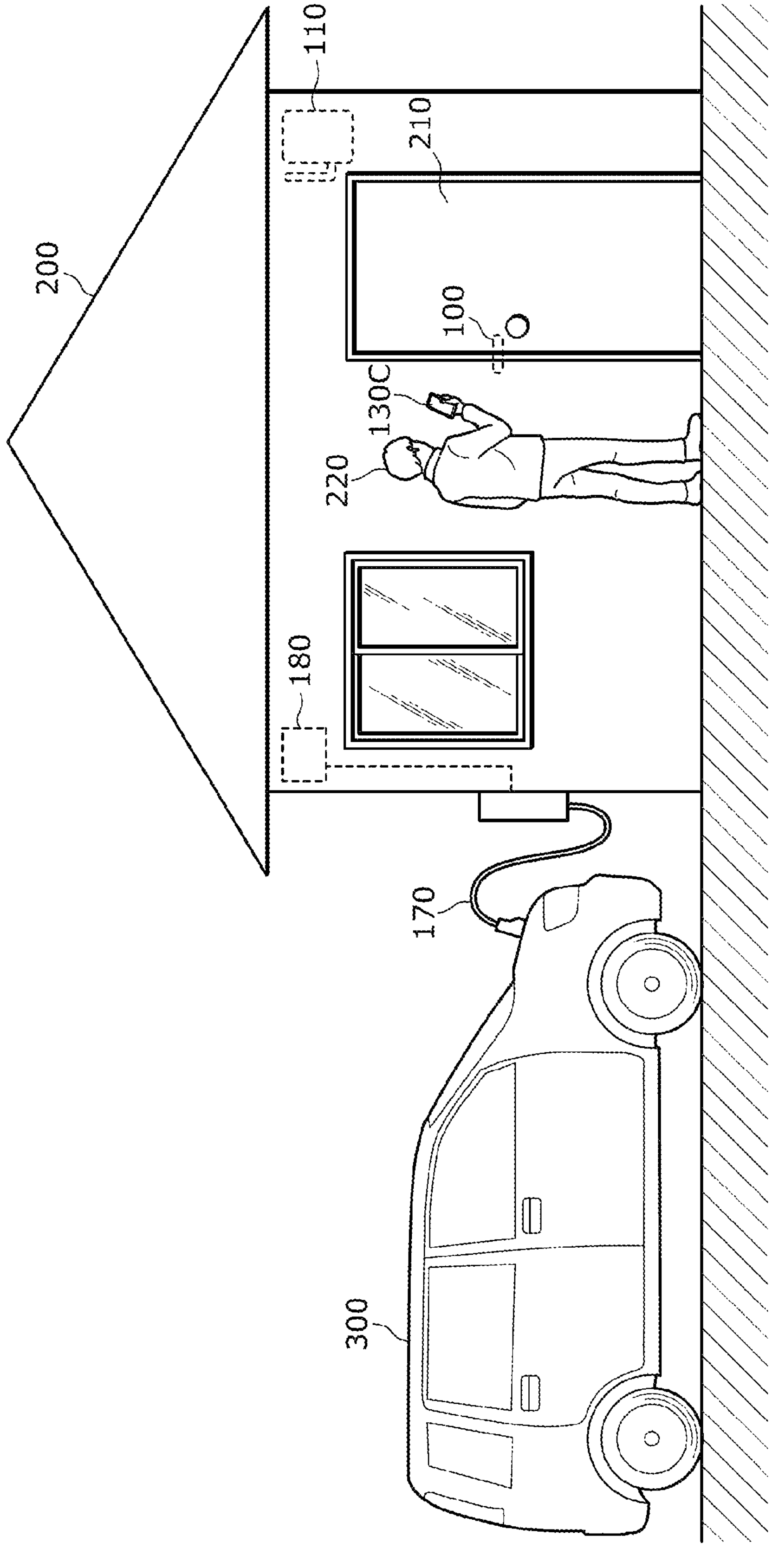
FIG. 29 is diagram schematically illustrating a portion of the hardware configuration of the electric lock control system according to Embodiment 3 provided to a building.

FIG. 29 is a diagram schematically illustrating a portion of the hardware configuration of electric lock control system 1C provided to building 200.

As illustrated in FIG. 28, electric lock control system 1C has a configuration in which, from electric lock control system 1 according to Embodiment 1, server device 120 is changed to server device 120C, information terminal 130 is changed to information terminal 130C, and battery charger 170 is added.

Server device 120C is equivalent to server device 120 in its hardware configuration, but part of the software to be executed has been changed from server device 120. For this reason, some of the functions implemented by server device 120C have been changed from the functions implemented by server device 120.

Information terminal 130C is equivalent to information terminal 130 in its hardware configuration, but part of the software to be executed has been changed from information terminal 130. For this reason, some of the functions implemented by information terminal 130C have been changed from the functions implemented by information terminal 130.

Information terminal 130C is carried by person 220 in the same manner as information terminal 130.

Battery charger 170 is provided to building 200 as illustrated in FIG. 29, and charges a driving battery mounted in electric vehicle 300 that is used by person 220. Battery charger 170, for example, may be located in proximity to building 200 (e.g., in a parking area located in a predetermined range from building 200).

Battery charger 170 is connected to in-building network 150, and detects that electric vehicle 300 has been connected.

Here, electric vehicle 300 may be, for example, an electric vehicle or a hybrid vehicle.

Battery charger 170 is, for example, supplied with power from distribution board 180 illustrated in FIG. 29. Distribution board 180 may be, for example, connected to in-building network 150.

Figure 30:
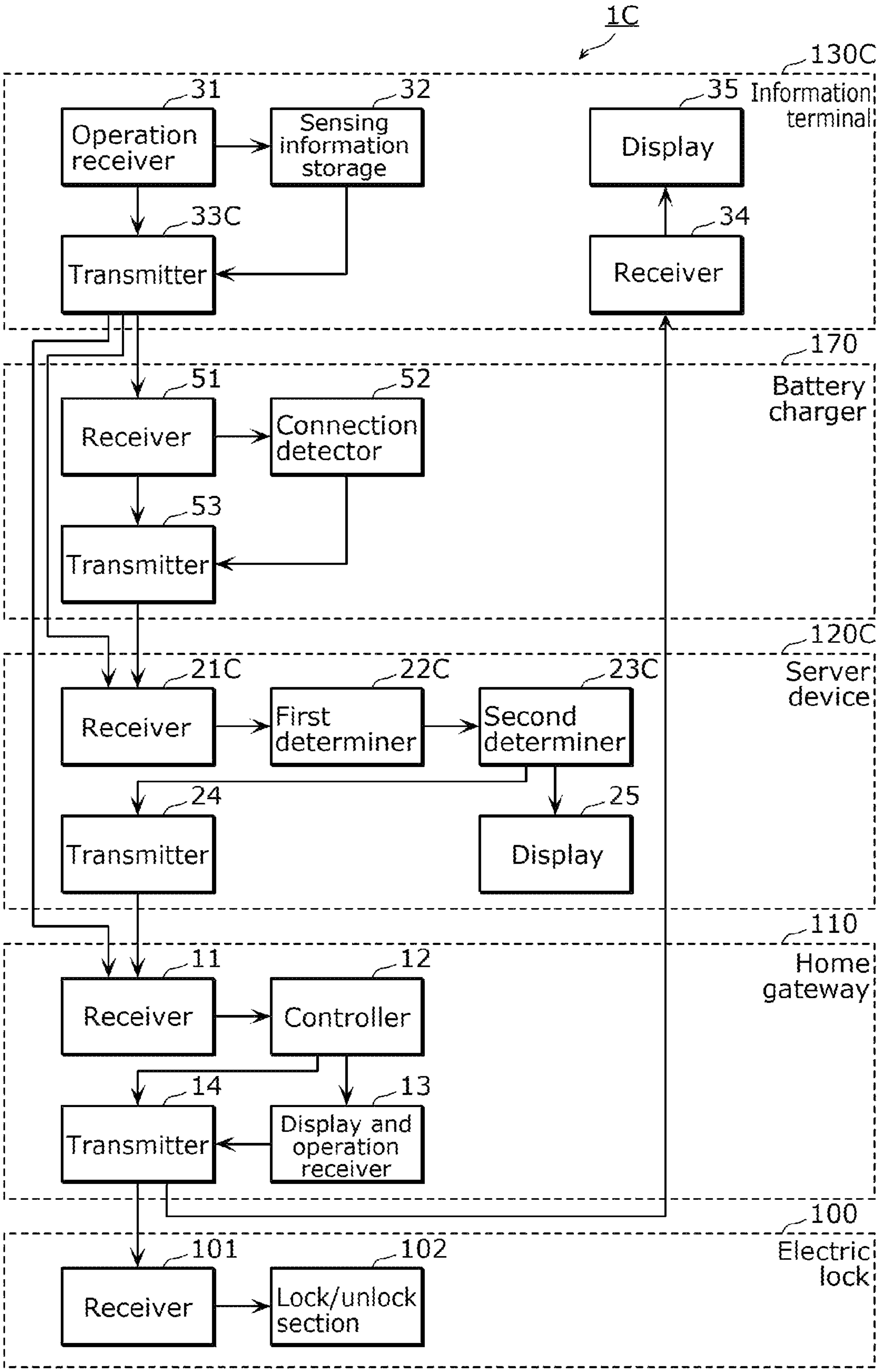
FIG. 30 is a block diagram illustrating one example of a functional configuration of the electric lock control system according to Embodiment 3.

FIG. 30 is a block diagram illustrating one example of the functional configuration of electric lock control system 1C.

As illustrated in FIG. 30, electric lock control system 1C has a configuration in which, from electric lock control system 1, transmitter 33 is changed to transmitter 33C, receiver 21 is changed to receiver 21C, first determiner 22 is changed to first determiner 22C, second determiner 23 is changed to second determiner 23C, and receiver 51, connection detector 52, and transmitter 53 are added.

Receiver 51, connection detector 52, and transmitter 53 are implemented by battery charger 170.

When operation receiver 31 receives an operation for requesting unlocking of electric lock 100 from a user of information terminal 130C, transmitter 33C transmits (i) an unlocking request signal to battery charger 170 and home gateway 110 and (ii) acceleration information and magnetic information to server device 120C.

Receiver 51 receives the unlocking request signal transmitted by information terminal 130C.

Connection detector 52 detects that electric vehicle 300 has been connected to battery charger 170.

For example, when battery charger 170 is a battery charger supporting ECHONET Lite (registered trademark), connection detector 52 may use a vehicle connection confirmation property to detect that electric vehicle 300 has been connected to battery charger 170.

In the case where receiver 51 has received an unlocking request signal from information terminal 130C, when connection detector 52 has detected that electric vehicle 300 has been connected to battery charger 170 in predetermined period T5 from the time of receiving the unlocking request signal to the past (e.g., three minutes), transmitter 53 transmits, to server apparatus 120C, connection information indicating that electric vehicle 300 has been connected to battery charger 170.

Receiver 21C receives the acceleration information and the magnetic information transmitted from information terminal 130C, and the connection information transmitted from battery charger 170.

When receiver 21C receives the connection information from battery charger 170, first determiner 22C determines whether person 220 who carries information terminal 130C is present in a predetermined range surrounding electric lock 100 (e.g., in a rage within two meters from electric lock 100), based on the connection information that has been received.

More specifically, when receiver 21C receives the connection information from battery charger 170, first determiner 22C determines that person 220 who carries information terminal 130C is present in a predetermined range surrounding electric lock 100.

Second determiner 23C, when it is determined by first determiner 22C that person 220 who carries information terminal 130C is present in the predetermined range surrounding electric lock 100, determines whether person 220 is person A who is permitted to unlock electric lock 100, based on the acceleration information and the magnetic information which have been received by receiver 21C.

Although the following describes that second determiner 23C determines whether person 220 is person A based also on magnetic information in addition to acceleration information, second determiner 23C need not necessarily be limited to being configured to determine whether person 220 is person A based on the acceleration information and the magnetic information, as long as being configured to determine whether person 220 is person A based on at least the acceleration information.

Second determiner 23C, for example, may: estimate movement characteristics of person 220 based on the acceleration information and the magnetic information; calculate a difference between the estimated movement characteristics and typical movement characteristics, which is stored in advance, of electric vehicle 300 on which person A rides; and determine that person 220 is person A when the calculated difference is less than or equal to a predetermined threshold, and that person 220 is not person A when the calculated difference is greater than the predetermined threshold.

Operation

The following describes an operation performed by electric lock control system 1C which has the above-described configuration.

Electric lock control system 1C performs a fourth electric lock control processing in which some processes are changed from the first electric lock control processing according to Embodiment 1.

The first electric lock control processing is processing that determines whether person 220 is present in a predetermined range surrounding electric lock 100 based on the positional information, and determines whether person 220 is person A based on the acceleration information. In contrast, the fourth electric lock control system is processing that determines whether person 220 is present in a predetermined range surrounding electric lock 100 based on connection information, and determines whether person 220 is person A based on the acceleration information.

Figure 31:
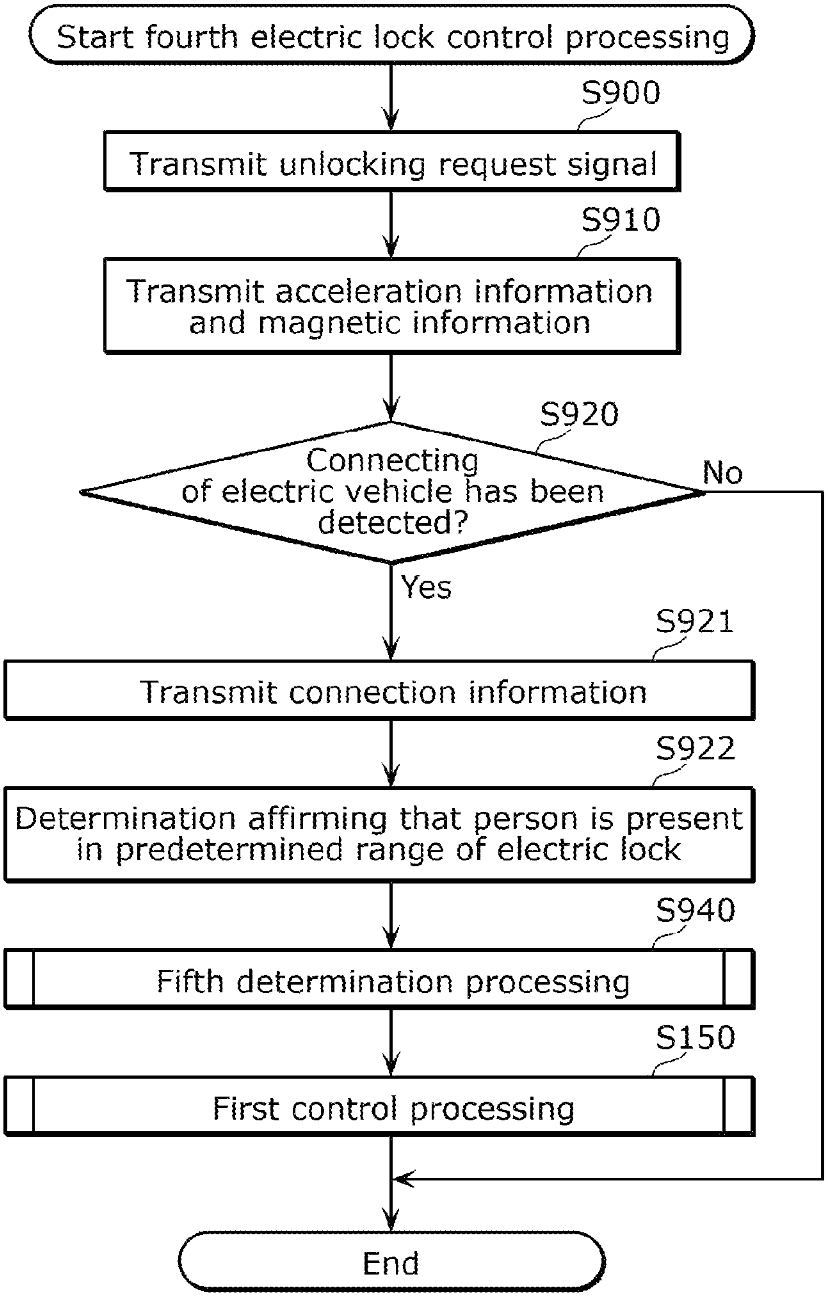
FIG. 31 is a flowchart of the fourth electric lock control processing.

FIG. 31 is a flowchart of the fourth electric lock control processing.

As illustrated in FIG. 31, the fourth electric lock control processing is processing in which, from the first electric lock control processing according to Embodiment 1: the process of Step S100 is changed to the process of Step S900; the process of Step S110 is changed to the process of Step S910; the process of Step S140 is changed to the process of Step S940; the process of Step S120 and the process of Step S130 are deleted; and the process of Step S920, the process of Step S921, and the process of Step S922 are added.

As illustrated in FIG. 31, after the fourth electric lock control processing is started, when person 220 performs an operation for requesting unlocking of electric lock 100 on information terminal 130C that person 220 carries, transmitter 33C transmits an unlocking request signal to battery charger 170 and home gateway 110 (Step S900), and transmits acceleration information and magnetic information to server device 120C (Step S910).

When receiver 51 receives the unlocking request signal transmitted from information terminal 130C, transmitter 53 checks whether connection detector 52 has detected that electric vehicle 300 has been connected to battery charger 170 in predetermined period T5 from the time of receiving the unlocking request signal to the past (Step S920).

When, in the process of Step S920, it is detected that electric vehicle 300 has been connected to battery charger 170 (Yes in Step S920), transmitter 53 transmits the connection information to server device 120C (Step S921).

When receiver 21C receives the connection information transmitted from battery charger 170, first determiner 22C makes a determination affirming that person 220 who carries information terminal 130C is present in a predetermined range surrounding electric lock 100 (Step S922).

When the process of Step S922 ends, electric lock control system 1C performs the fifth determination processing (Step S940).

Figure 32:
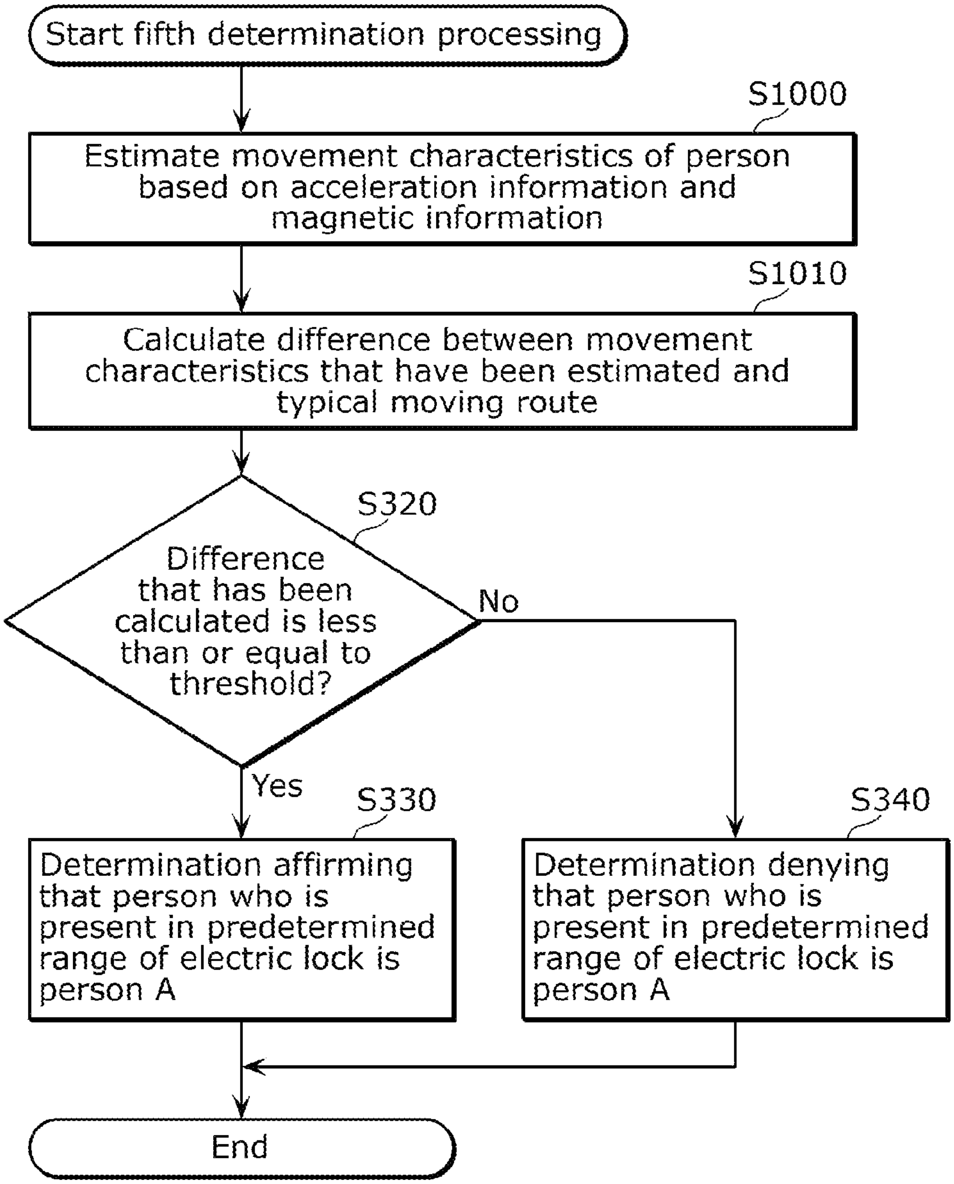
FIG. 32 is a flowchart of the fifth determination processing.

FIG. 32 is a flowchart of the fifth determination processing.

As illustrated in FIG. 32, the fifth determination processing is processing in which, from the second determination processing according to Embodiment 1, the process of Step S300 is changed to the process of Step S1000, and the process of Step S310 is changed to the process of Step S1010.

As illustrated in FIG. 32, when the fifth determination processing is started, second determiner 23C estimates movement characteristics of person 220 based on the acceleration information and the magnetic information (Step S1000), and calculates a difference between the estimated movement characteristics and typical movement characteristics, which is stored in advance, of electronic vehicle 300 on which person A rides (Step S1010). Then, the fifth determination processing proceeds to the process of Step S320.

When the process of Step S330 ends, or when the process of Step S340 ends, electric lock control system 1C ends the fifth determination processing.

Returning again to FIG. 31, the description of the fourth electric lock control processing will be continued.

When the fifth determination processing of Step S940 ends, the fourth electric lock control processing proceeds to the first control processing (Step S150).

When, in the process of Step S920, it is not detected that electric vehicle 300 has been connected to battery charger 170 (No in Step S920), or when the first control processing of Step S150 ends, electric lock control system 1C ends the fourth electric lock control processing.

Consideration

As described above, electric lock control system 1C having the above-described configuration is capable of determining whether person 220 is person A based on a difference between the movement characteristics of person 220 that have been estimated and the typical movement characteristics, which are stored in advance, of electric vehicle 300 on which person A rides.

In this manner, electric lock control system 1C determines whether person 220 is present in proximity to electric lock 100 and whether person 220 is a person who is permitted to unlock electric lock 100, and controls the state, which is a locked state or an unlocked state, of the electric lock based on a result of the determination, in the same manner as electric lock control system 1 according to Embodiment 1.

Thus, according to electric lock control system 1C, it is possible to inhibit unlocking of electric lock 100 in an unauthorized manner by a person who is not permitted to unlock electric lock 100, as with electric lock control system 1 according to Embodiment 1.

It should be noted that, in Embodiment 4, it has been described that battery charger 170 detects that electric vehicle 300 has been connected to battery charger 170, and battery charger 170 transmits connection information to server device 120C. In contrast, as another configuration example, distribution board 180 which supplies power to battery charger 170, for example, may detect that electric vehicle 300 has been connected to battery charger 170 based on a change in the current flowing to battery charger 170, and transmit connection information to server device 120C.

Embodiment 4

The following describes an electric lock control system according to Embodiment 4 which has a configuration a part of which is changed from electric lock control system 1 according to Embodiment 1.

Electric lock control system 1 is one example of a system that: estimates a moving route of person 220 from acceleration information; calculates a difference between the estimated moving route and a typical moving route of person A stored in advance; and determines whether person 220 is person A based on the difference that has been calculated.

In contrast, the electric lock control system according to Embodiment 4 is one example of a system that determines whether person 220 is person A, using a machine learning model trained in advance to output, in response to acceleration information being input, a score indicating certainty that person 220 is person A.

Here, in regard to the electric lock control system according to Embodiment 4, the same reference numerals are assigned to structural elements equivalent to the structural elements of electric lock control system 1 as such structural elements have already been described and the detailed description for such structural elements will be omitted, and description will be provided with a focus on the difference from electric lock control system 1.

Configuration

Figure 33:
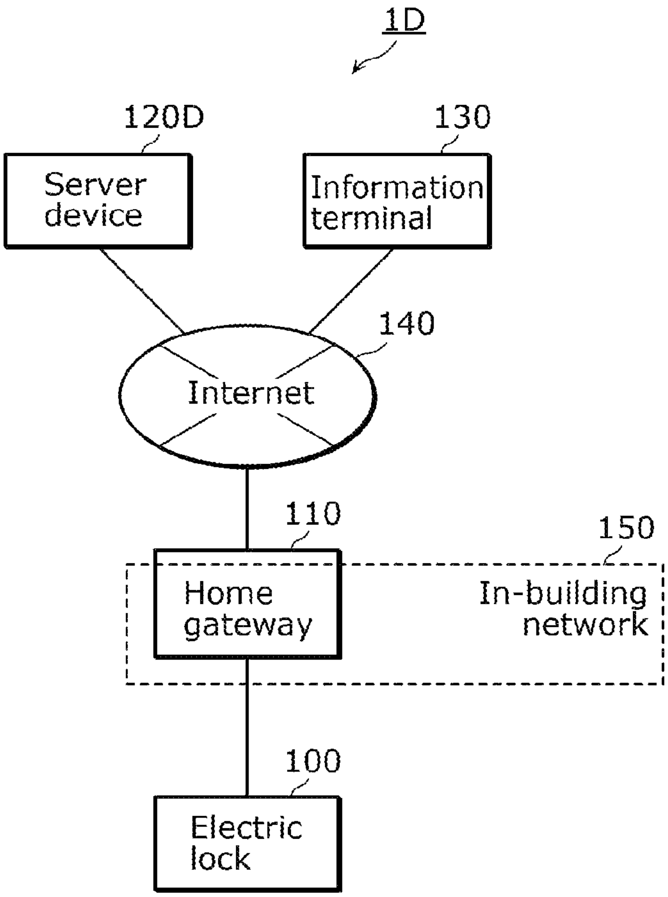
FIG. 33 is a diagram schematically illustrating one example of a hardware configuration of an electric lock control system according to Embodiment 4.

FIG. 33 is a block diagram illustrating one example of the hardware configuration of electric lock control system 1D according to Embodiment 4.

As illustrated in FIG. 33, electric lock control system 1D has a configuration in which, from the configuration of electric lock control system 1 according to Embodiment, server device 120 is changed to server device 120D.

Server device 120D is equivalent to server device 120 in its hardware configuration, but part of the software to be executed has been changed from server device 120. For this reason, some of the functions implemented by server device 120D have been changed from the functions implemented by server device 120.

Figure 34:
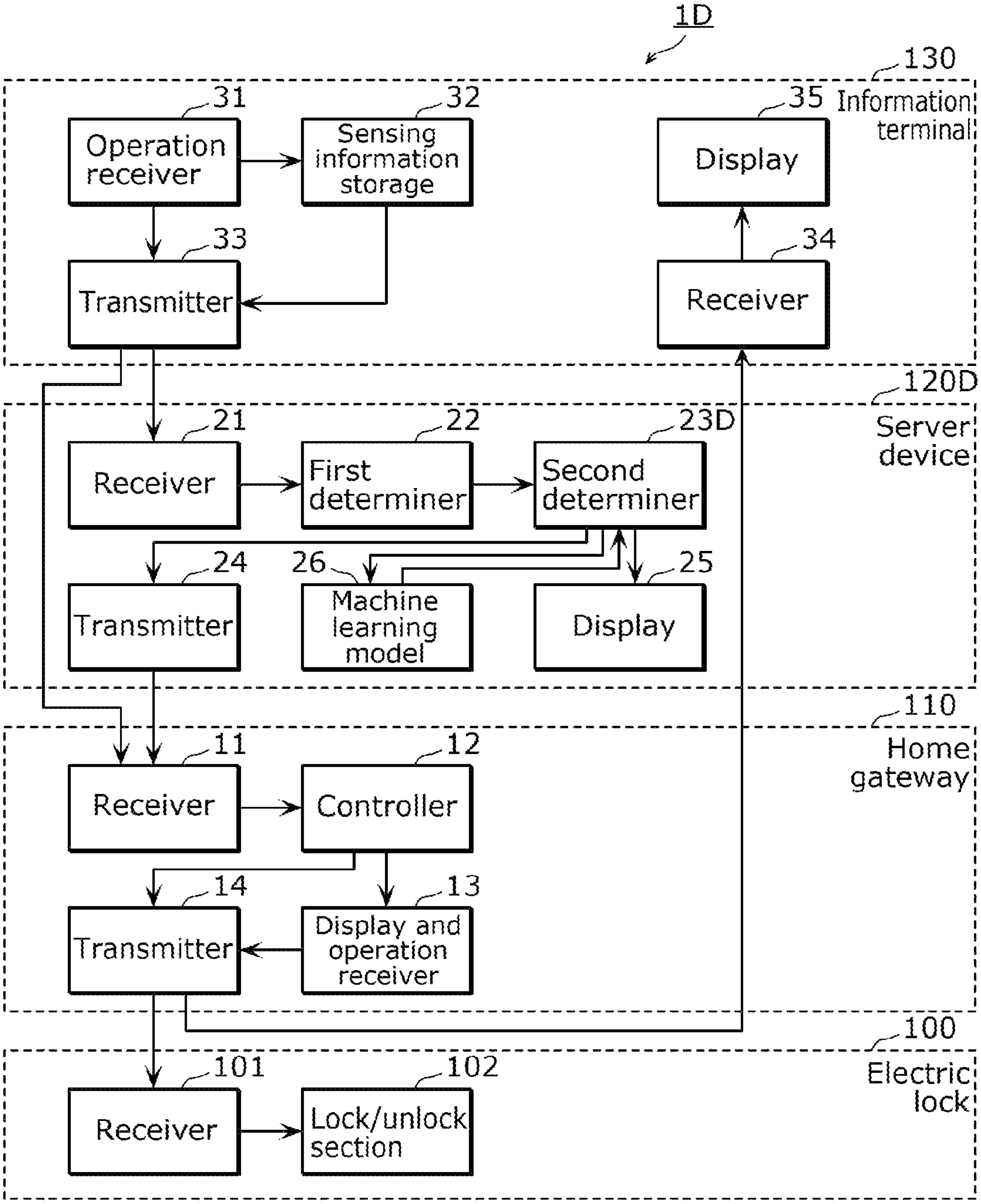
FIG. 34 is a block diagram illustrating one example of a functional configuration of the electric lock control system according to Embodiment 4.

FIG. 34 is a block diagram illustrating one example of the functional configuration of electric lock control system 1D.

As illustrated in FIG. 34, electric lock control system 1D has a configuration in which, from electric lock control system 1, second determiner 23 is changed to second determiner 23D, and machine learning model 26 is added.

Machine learning model 26 is a machine learning model that is trained in advance to output, in response to acceleration information being input, a score indicating certainty that a person who carries information terminal 130 is person A who is permitted to unlock electric lock 100.

Machine learning model 26 is, for example, a learning model using a neural network. Machine learning model 26, for example, may be implemented by executing, by a processor included by server device 120D, a program stored in a memory included by server device 120D.

The following describes machine learning model 26 as a machine learning model which is trained in advance to output, in response to the magnetic information being input in addition to the acceleration information, a score indicating certainty that a person who carries information terminal 130 is person A. However, machine learning model 26 need not necessarily limited to a machine learning model which is trained in advance to output, in response to the magnetic information being input in addition to the acceleration information, a score indicating certainty that a person who carries information terminal 130 is person A, as long as machine learning model 26 is a machine learning model which is trained in advance to output, in response to at least the acceleration information being input, a score indicating certainty that a person who carries information terminal 130 is person A.

Machine learning model 26, for example, may be trained in advance, with one or more acceleration information and magnetic information transmitted from information terminal 130 as correct data, when person A is caused to move along one or more typical moving routes of person A in a state in which information terminal 130 is carried by person A.

Machine learning model 26, for example, may be trained in advance by server device 120D or may be trained in advance by a device other than server device 120D.

When there are a plurality of persons A who are permitted to unlock electric lock 100, electric lock control system 1D may include a plurality of machine learning models 26 each corresponding to a corresponding one of the plurality of persons A.

Figure 35:
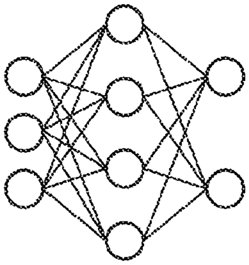
FIG. 35 is a diagram schematically illustrating one example in which the electric lock control system according to Embodiment 4 includes a plurality of machine learning models.
Figure 35:
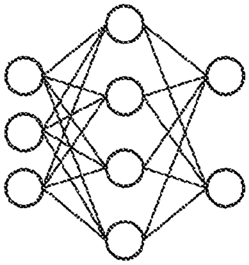
Figure 35:
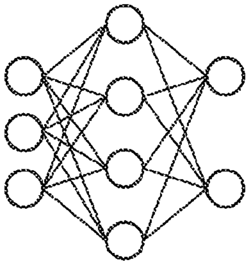

FIG. 35 is a diagram schematically illustrating one example in which electric lock control system 1D includes a plurality of machine learning models 26 each corresponding to a corresponding one of a plurality of persons A.

In addition, when there are a plurality of persons A who are permitted to unlock electric lock 100, electric lock control system 1D may include one machine learning model 26 that outputs a plurality of scores each corresponding to a corresponding one of the plurality of persons A.

Figure 36:
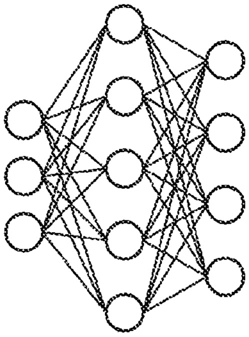
FIG. 36 is a diagram schematically illustrating one example in which the electric lock control system according to Embodiment 4 includes a single machine learning model.

FIG. 36 is a diagram schematically illustrating one example in which electric lock control system 1D includes one machine learning model 26 that outputs a plurality of scores each corresponding to a corresponding one of a plurality of persons A.

Returning again to FIG. 34, the description of electric lock control system 1D will be continued.

Second determiner 23D, when it is determined by first determiner 22 that person 220 who carries information terminal 130 is present in the predetermined range surrounding electric lock 100, determines whether person 220 is person A, using a machine learning model.

More specifically, second determiner 23D inputs the acceleration information and the magnetic information received by receiver 21 to machine learning model 26 to obtain a score output from machine learning model 26, and determines: that person 220 is person A when the certainty that person 220 is person A indicated by the obtained score is greater than or equal to a predetermined threshold; and that person 220 is not person A when the certainty is less than the predetermined threshold.

When machine learning model 26 is a machine learning model trained in advance to output, in response to acceleration information being input, a score indicating the certainty that a person who carries information terminal 130 is person A, second determiner 23D inputs the acceleration information received by receiver 21 to machine learning model 26 to obtain a score output from machine learning model 26, and determines: that person 220 is person A when the certainty that person 220 is person A indicated by the obtained score is greater than or equal to a predetermined threshold; and that person 220 is not person A when the certainty is less than the predetermined threshold.

Operation

The following describes an operation performed by electric lock control system 1D which has the above-described configuration.

Electric lock control system 1D performs a fifth electric lock control processing in which some processes are changed from the first electric lock control processing according to Embodiment 1.

The first electric lock control processing is processing that: estimates a moving route of person 220 from acceleration information; calculates a difference between the estimated moving route and a typical moving route of person A stored in advance; and determines whether person 220 is person A based on the difference that has been calculated. In contrast, the fifth electric lock control processing is processing that determines whether person 220 is person A, using a machine learning model trained in advance to output, in response to acceleration information being input, a score indicating the certainty that person 220 is person A.

Figure 37:
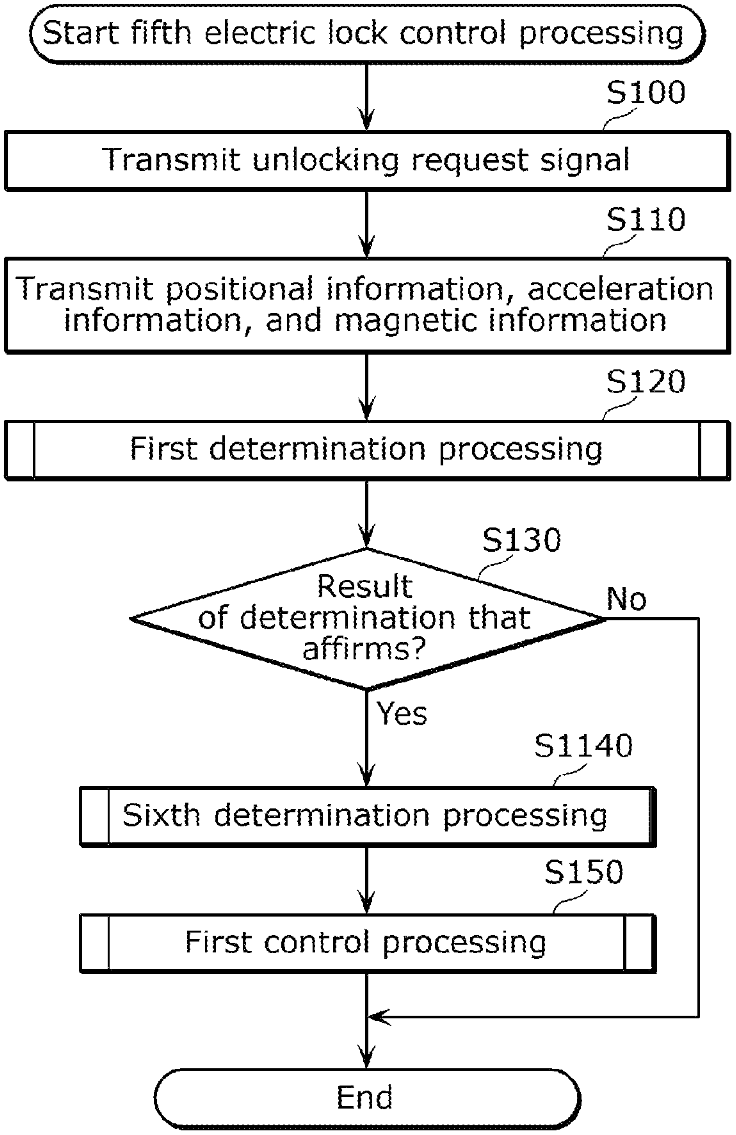
FIG. 37 is a flowchart of the fifth electric lock control processing.

FIG. 37 is a flowchart of the fifth electric lock control processing.

As illustrated in FIG. 37, the fifth electric lock control processing is processing in which, from the first electric lock control processing according to Embodiment 1, the process of Step S140 is changed to the process of Step S1140.

As illustrated in FIG. 37, when it is determined, in the process of Step S130, that the determination that has been made in the first determination processing is a determination affirming that person 220 who carries information terminal 130 is present in the predetermined range surrounding electric lock 100 (Yes in Step S130), electric lock control system 1 performs a sixth determination processing (Step S1140).

Figure 38:
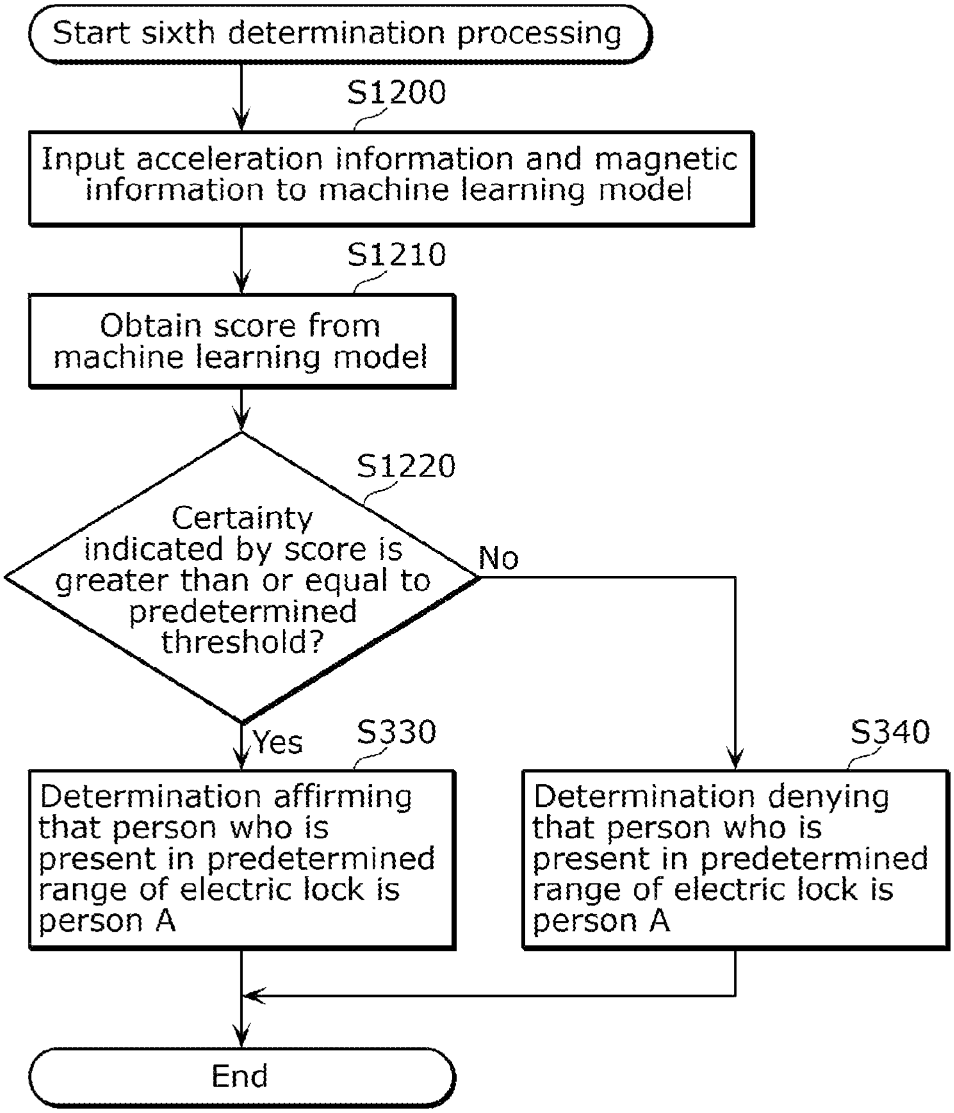
FIG. 38 is a flowchart of the sixth determination processing.

FIG. 38 is a flowchart of the sixth determination processing.

As illustrated in FIG. 38, the sixth determination processing is processing in which, from the second determination processing according to Embodiment 1, the process of Step S300 is changed to the process of Step S1200, the process of Step S310 is changed to the process of Step S1210, and the process of Step S320 is changed to the process of Step S1220.

As illustrated in FIG. 38, when the sixth determination processing is started, second determiner 23D inputs the acceleration information and the magnetic information which have been received by receiver 21 to machine learning model 26 (Step S1200). In response, machine learning model 26 outputs a score indicating the certainty that person 220 who in present in a predetermined range surrounding electric lock 100 is person A who is permitted to unlock electric lock 100.

When the score is output from machine learning model 26, second determiner 23D obtains the score output from machine learning model 26 (Step S1210), and determines whether the certainty that person 220 is person A indicated by the obtained score is greater than or equal to a predetermined threshold (Step S1220).

When it is determined in the process of Step S1220 that the certainty that person 220 is person A is greater than or equal to the predetermined threshold (Yes in Step S1220), the sixth determination processing proceeds to the process of Step S330.

When it is determined in the process of Step S1220 that the certainty that person 220 is person A is not greater than or equal to the predetermined threshold (No in Step S1220), the sixth determination processing proceeds to the process of Step S340.

When the process of Step S330 ends, or when the process of Step S340 ends, electric lock control system 1D ends the sixth determination processing.

Returning again to FIG. 37, the description of the fifth electric lock control processing will be continued.

When the sixth determination processing of Step S1140 ends, the fifth electric lock control processing proceeds to the first control processing (Step S150).

When it is determined, in the process of Step S130, that the determination that has been made in the first determination processing is not a determination affirming that person 220 who carries information terminal 130 is present in the predetermined range surrounding electric lock 100 (No in Step S130), or when the first control processing of Step S150 ends, electric lock control system 1D ends the fifth electric lock control processing.

Consideration

As described above, electric lock control system 1D having the above-described configuration is capable of determining whether person 220 is person A, using machine learning model 26 trained in advance.

In this manner, electric lock control system 1D determines whether person 220 is present in proximity to electric lock 100 and whether person 220 is a person who is permitted to unlock electric lock 100, and controls the state, which is a locked state or an unlocked state, of the electric lock based on a result of the determination, in the same manner as electric lock control system 1 according to Embodiment 1.

Thus, according to electric lock control system 1D, it is possible to inhibit unlocking of electric lock 100 in an unauthorized manner by a person who is not permitted to unlock electric lock 100, as with electric lock control system 1 according to Embodiment 1.

Supplement

As described above, the present disclosure has been described based on Embodiments 1 to 4 and the variations as examples of the technique disclosed by the present application. It should be noted that the present disclosure is not limited to the above-described Embodiments 1 to 4 and the variations. Other forms in which various modifications apparent to those skilled in the art are applied to the embodiments, or forms structured by combining structural components of different embodiments may be included within the scope of one or more aspects of the present disclosure, unless such changes and modifications depart from the scope of the present disclosure.

One aspect of the present disclosure may be not only the above-described electric lock control system 1, etc., but also an electric lock control method including, as steps, characteristic structural components included in electric lock control system 1, etc. In addition, one aspect of the present disclosure may be a computer program which causes a computer to execute each of the characteristic steps included in the electric lock control method. Furthermore, one aspect of the present disclosure may be a non-transitory computer-readable recording medium having such a computer program recorded thereon.

INDUSTRIAL APPLICABILITY

The present disclosure can be widely used in a system that controls an electric lock, etc.

The invention claimed is:

1. An electric lock control method comprising:

performing a first determination of whether a person is present in a predetermined region surrounding an electric lock, based on first information generated by an electronic device;

when it is determined that a first person is present in the predetermined region in the performing of the first determination, performing a second determination of whether the first person is a person who is permitted to unlock the electric lock, based on second information related to movement of the first person; and controlling a state of the electric lock based on a result of the second determination, the state being a locked state or an unlocked state, wherein the electric lock is settable to one of at least two security levels, the at least two security levels include a first security level and a second security level, and the controlling includes:

when it is determined that the first person is the person who is permitted to unlock the electric lock in the performing of the second determination, putting the electric lock in an unlocked state; and when it is not determined that the first person is the person who is permitted to unlock the electric lock in the performing of the second determination, (i) when the electric lock is preset to the first security level, putting the electric lock in the unlocked state, and (ii) when the electric lock is preset to the second security level: receiving an input indicating whether to permit unlocking of the electric lock;

(ii-i) when the input received indicates that unlocking of the electric lock is permitted, putting the electric lock in the unlocked state; and (ii-ii) when the input received indicates that unlocking of the electric lock is not permitted, not putting the electric lock in the unlocked state.

2. The electric lock control method according to claim 1, wherein the electronic device is an information terminal carried by the first person, the first information is positional information indicating a position of the information terminal, and the second information is: acceleration information indicating an acceleration rate detected by an acceleration sensor included in the information terminal; or step count information indicating a step count of the first person counted by the information terminal.

3. The electric lock control method according to claim 1, wherein the electronic device is an imaging device, the first information is an image captured by the imaging device, and the second information is gait information related to a gait of the first person, the gait information being calculated based on the image captured by the imaging device.

4. The electric lock control method according to claim 1, wherein the electric lock is disposed on a door of a doorway of a building, the electronic device is: a battery charger that charges an electric vehicle and is disposed in the building or within a predetermined range from the building; or a distribution board that supplies power to the battery charger, the first information is connection information indicating that the electric vehicle has been connected to the battery charger, and the second information is acceleration information indicating an acceleration rate detected by an acceleration sensor included in an information terminal carried by the first person.

5. The electric lock control method according to claim 1, wherein in the performing of the second determination, whether the first person is the person who is permitted to unlock the electric lock is determined using a machine learning model trained in advance to output, in response to the second information being input, a score indicating certainty that the first person is the person who is permitted to unlock the electric lock.

6. The electric lock control method according to claim 1, wherein the controlling includes outputting a warning signal when it is not determined that the first person is the person who is permitted to unlock the electric lock in the performing of the second determination.

7. The electric lock control method according to claim 6, wherein the electronic device is an information terminal carried by the first person, the first information is positional information indicating a position of the information terminal, and the warning signal is of an image indicating an alarm on a map of an area surrounding a position of the information terminal indicated by the positional information.

8. An electric lock control system comprising:

a first determiner that determines whether a person is present in a predetermined region surrounding an electric lock, based on first information generated by an electronic device;

a second determiner that, when the first determiner has determined that a first person is present in the predetermined region, determines whether the first person is a person who is permitted to unlock the electric lock, based on second information related to movement of the first person; and a controller that controls a state of the electric lock based on a result of the determination by the second determiner, the state being a locked state or an unlocked state, wherein the electric lock is settable to one of at least two security levels, the at least two security levels include a first security level and a second security level, the controller:

when the second determiner has determined that the first person is the person who is permitted to unlock the electric lock, puts the electric lock in an unlocked state; and when the second determiner has not determined that the first person is the person who is permitted to unlock the electric lock, (i) when the electric lock is preset to the first security level, puts the electric lock in the unlocked state, and (ii) when the electric lock is preset to the second security level: receives an input indicating whether to permit unlocking of the electric lock;

(ii-i) when the input received indicates that unlocking of the electric lock is permitted, puts the electric lock in the unlocked state; and (ii-ii) when the input received indicates that unlocking of the electric lock is not permitted, does not put the electric lock in the unlocked state.

9. A non-transitory computer-readable recording medium having recorded thereon a computer program for causing a computer to execute electric lock control processing, wherein the electric lock control processing includes:

performing a first determination of whether a person is present in a predetermined region surrounding an electric lock, based on first information generated by an electronic device;

when it is determined that a first person is present in the predetermined region in the performing of the first determination, performing a second determination of whether the first person is a person who is permitted to unlock the electric lock, based on second information related to movement of the first person; and controlling a state of the electric lock based on a result of the second determination, the state being a locked state or an unlocked state, the electric lock is settable to one of at least two security levels, the at least two security levels include a first security level and a second security level, and the controlling includes:

when it is determined that the first person is the person who is permitted to unlock the electric lock in the performing of the second determination, putting the electric lock in an unlocked state; and when it is not determined that the first person is the person who is permitted to unlock the electric lock in the performing of the second determination, (i) when the electric lock is preset to the first security level, putting the electric lock in the unlocked state, and (ii) when the electric lock is preset to the second security level: receiving an input indicating whether to permit unlocking of the electric lock;

(ii-i) when the input received indicates that unlocking of the electric lock is permitted, putting the electric lock in the unlocked state; and (ii-ii) when the input received indicates that unlocking of the electric lock is not permitted, not putting the electric lock in the unlocked state.

* * * * *